United States Patent
LeVasseur et al.

(10) Patent No.: US 9,754,217 B2
(45) Date of Patent: Sep. 5, 2017

(54) DATA LEAK PROTECTION SYSTEM AND PROCESSING METHODS THEREOF

(71) Applicant: Cirius Messaging Inc., Vancouver (CA)

(72) Inventors: Thierry LeVasseur, Vancouver (CA); Philippe Richard, Vancouver (CA)

(73) Assignee: Cirius Messaging Inc., Vancouver, BC (CA)

( * ) Notice: Subject to any disclaimer, the term of this patent is extended or adjusted under 35 U.S.C. 154(b) by 0 days.

(21) Appl. No.: 14/702,504

(22) Filed: May 1, 2015

(65) Prior Publication Data
US 2016/0323243 A1    Nov. 3, 2016

(51) Int. Cl.
| | |
|---|---|
| G06F 17/00 | (2006.01) |
| G06F 15/16 | (2006.01) |
| G06F 19/00 | (2011.01) |
| G06N 99/00 | (2010.01) |
| H04L 29/06 | (2006.01) |
| G06F 21/64 | (2013.01) |

(52) U.S. Cl.
CPC ........... G06N 99/005 (2013.01); G06F 21/64 (2013.01); H04L 63/1416 (2013.01)

(58) Field of Classification Search
CPC ............. H04L 63/0209; H04L 63/0281; G06F 21/604; G06N 99/005
USPC ...................................... 726/1, 12
See application file for complete search history.

(56) References Cited

U.S. PATENT DOCUMENTS

| | | | | |
|---|---|---|---|---|
| 9,197,628 | B1* | 11/2015 | Hastings | H04L 63/0254 |
| 9,342,697 | B1* | 5/2016 | Ren | G06F 21/60 |
| 9,349,016 | B1* | 5/2016 | Brisebois | G06F 21/60 |
| 2006/0080308 | A1* | 4/2006 | Carpentier | H04L 67/108 |
| 2009/0022324 | A1* | 1/2009 | Inokuchi | G11B 20/00086 |
| | | | | 380/279 |
| 2012/0106366 | A1* | 5/2012 | Gauvin | H04L 43/0835 |
| | | | | 370/252 |
| 2016/0140207 | A1* | 5/2016 | Koeten | G06F 17/30598 |
| | | | | 707/737 |

OTHER PUBLICATIONS

Gray Young; Magic Quadrant for Network Intrusion Prevention System Appliances; Gartner Inc:2009; p. 1-20.*

* cited by examiner

*Primary Examiner* — Monjour Rahim
(74) *Attorney, Agent, or Firm* — Alleman Hall Creasman & Tuttle LLP

(57) ABSTRACT

A data leak protection system and methods thereof are described that identify and analyze a digital fingerprint for a data package, the digital fingerprint characterizing the data package based on a corpus of data within the data package. In one embodiment, an asset descriptor is configured to identify one or more assets within the corpus of data while a contextual analyzer frames the one or more assets into the prevailing contextual environment. Then, a domain identifier further identifies a data perimeter based on the assets identified for the prevailing contextual environment. A comparison of the digital fingerprint to a collection of domain specific identifiers allows further actions responsive to a digital fingerprint falling outside of the data perimeter for an identified contextual environment. In one example, a data leak triggers quarantining of the data package for further manual processing.

20 Claims, 13 Drawing Sheets

DATA LEAK PROTECTION SYSTEM AND PROCESSING METHODS THEREOF

BACKGROUND

Data leak protection techniques may be used to protect confidential information in an attempt to preventing such information from leaving the boundaries of an organization. However, a major shortcoming of conventional data leak protection techniques is a reliance on human-defined policies. For example, a policy may be set to prohibit emails containing a human defined keyword from being transmitted by an email server. Such policies may trap emails that do not contain confidential information, and may not trap other emails that do contain confidential information. Even if the keywords are updated over time by human operators, approaches that use human defined keywords are subject to a high number of false positives. Increasingly, people communicate via multiple types of communications programs. Thus, keyword based policies set on an email server have another drawback in that they cannot prevent transmission of confidential information on a different platform, such as a SMS messaging platform, chat platform, etc. The false positive and leaks are exacerbated by the sheer volume of electronic communications in modern organizations, as the number of electronic messages sent each day globally is in the billions.

SUMMARY

The inventors have recognized issues with existing data security processes that are intrinsically reactive and susceptible to human error and data leaks. The inventors herein describe a data leak protection system configured to leverage machine learning to enhance data security in an exemplary message processing device. In one particular example, data leaks are prevented within a corporate organization, which thereby increases the operational efficiency of the organization and enhances the effectiveness of business decisions in the daily operations of the company.

As described herein, a data leak protection system according to the present disclosure identifies and analyzes a digital fingerprint for a data package. For this reason, the system comprises a digital fingerprint generator for characterizing the data package based on a corpus of data within the data package, and identifying the digital fingerprint based on the characterized data package. The digital fingerprint generator further comprises an asset descriptor for identifying one or more assets within the corpus of data and a contextual analyzer that frames the one or more assets within the corpus of data into a prevailing contextual environment. In other words, the system may identify high-value assets in a message while also determining the context around which the message is being transmitted. A domain identifier is further included for identifying a data perimeter based on the one or more assets and prevailing contextual environment. With this arrangement, the data leak prevention system moves beyond traditional intrusion detection systems by allowing an organization to identify a domain to be used for interpreting whether a potential data leak exists during a data transmission event.

For example, a department within the corporate organization may use a colloquial terminology or a departmentally defined lexicon during data exchanges. Therefore, the data leak protection system disclosed may account for such features while employing machine learning methods that enable enhanced identification, analysis, visualization, and ultimately actions to be taken based on uniquely identifiable patterns within each message that exist within the organization.

A fingerprint analyzer is further included that compares the digital fingerprint identified for a data package to a collection of domain specific identifiers, each domain specific identifier characterizing the identified digital fingerprint in one or more domains. For example, a digital fingerprint of an e-mail from an individual within the human resources (HR) department that includes a financial document attachment may be compared to stored domain specific identifiers (e.g., HR domain, finance domain, legal domain, administrative domain, etc. . . . ). Then, based on the comparison and mapped associations, the data leak prevention system may characterize the digital fingerprint within each domain as a measure of performing a risk assessment, the risk assessment indicating the potential for a data leak or breach. Comparisons between the digital fingerprint and the collection of domain specific identifiers may include determining an amount of congruence or similarity between the digital fingerprint and each of the domain specific objects. In other words, the data leak prevention system may include methods for identifying an equivalence relation that characterizes the degree of similarity between the digital fingerprint and a domain specific identifier. In some instances, the equivalence relation may be a quantitative metric based on the mapped associations among the domains and identifiers present within the data leak prevention system. In this way, a quantitative metric for each domain that characterizes the congruence between the digital fingerprint and domain specific identifier may be compared to the data perimeter for the domain to identify potential data leaks.

Thereafter, a processing gateway is included for processing the comparisons, and to trigger a data leak notification that enables further actions to be taken when an identified digital fingerprint falls outside of the data perimeter for one or more domains.

The data leak protection system may be enhanced to optimize protection by including rules that are maintained by a system administrator in substantially real-time. Thus, informational revising policies may evolve based on previous breach incidents, for example, and may be broadly implemented based on industry-wide information; contextual rules for framing assets or textual references beyond keyword matching; and an easily scalable architecture that allows large volumes of information to be analyzed across multiple data mediums.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
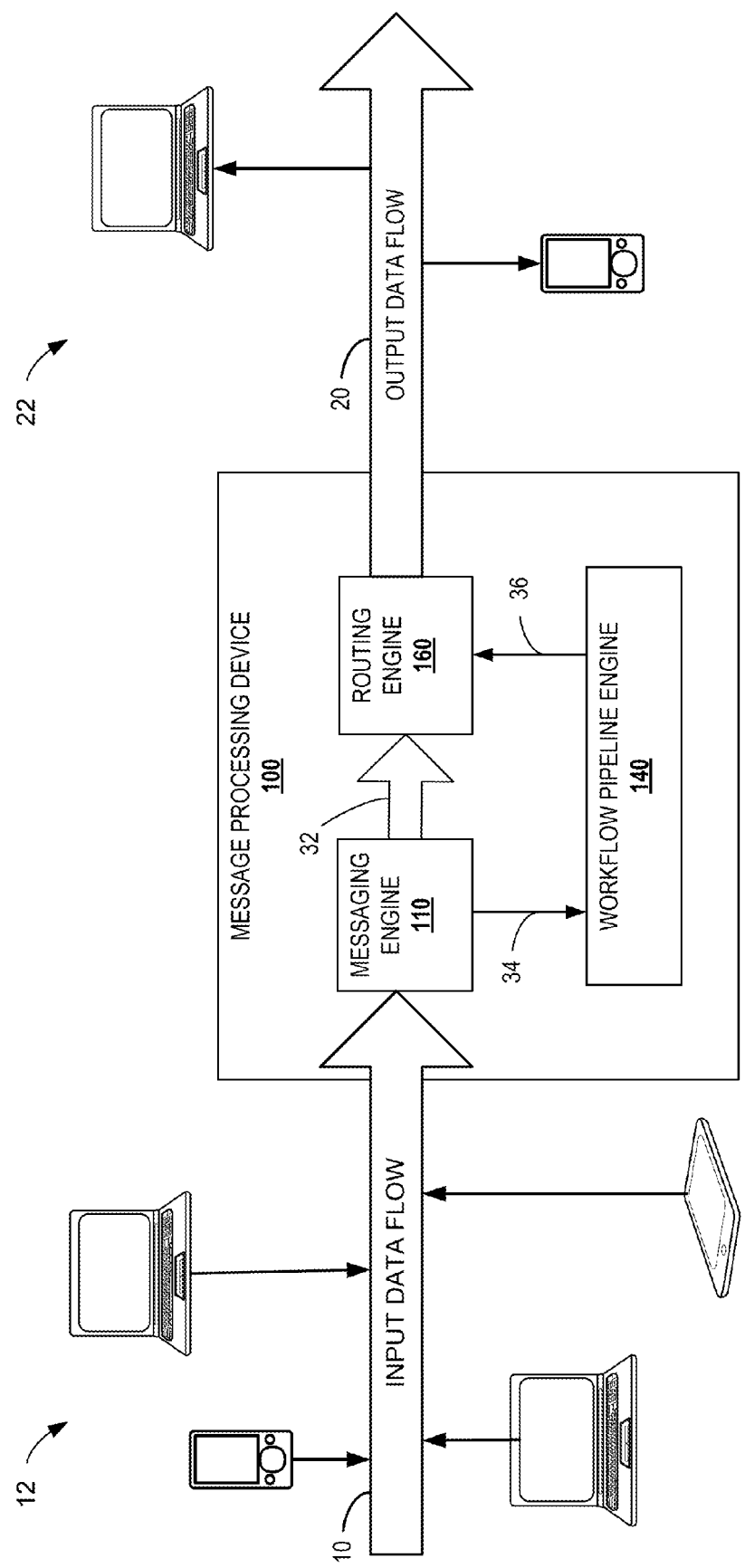
FIG. 1 illustrates an example data flow for a secure messaging gateway processing device.

A system and methods are described for identifying data leaks in a secure messaging gateway. Although the description is provided in the context of a secure messaging gateway, this example is non-limiting and other operating environments exist where the system and methods may be advantageously employed. For simplicity, the system and methods herein comprise identifying one or more assets within a data package, framing the one or more assets identified into a contextual environment; and identifying a data perimeter for the one or more assets and the contextual environment to generate a digital fingerprint for the data package based on the assets identified, the contextual environment, and the data perimeter.

A digital fingerprint is a coded string of binary digits that uniquely identifies the data file by the digital contents therein and/or the presence and contents of attachments. The digital fingerprint herein advantageously considers contextual indicators within a message in addition to the assets of the message (e.g., keywords, etc.) to determine whether a potential risk exists for data leakage based on the contextual indicators identified. In some instances, a contextual fingerprint may also be generated and further incorporated into the digital fingerprint. The contextual fingerprint is a coded string of binary digits related to contextual indicators that may be associated with a message. Thus, the contextual fingerprint may be different than a digital fingerprint framed within a contextual environment since the additional contextual fingerprint may identify the data file uniquely by the contextual indicators. In this way, the contextual fingerprint provides additional data elements that may be used to identify potential data leaks during processing.

The digital fingerprint is compared to a collection of domain specific identifiers, each domain specific identifier characterizing the digital fingerprint within the domain. Then, based on the comparison of the digital fingerprint to the collection of domain specific identifiers, the collection of domain specific identifiers may be further refined to update the contents, and a data leak notification triggered in response to a digital fingerprint that indicates the data package falls outside of the data perimeter for the contextual environment identified. Then, an action may be taken such as quarantining the data package for further manual processing such as a visual inspection based on the triggered data leak notification.

A data perimeter represents a reference point or boundary within a domain that serves to identify potential data leaks based on the combination of data elements included within a data file. As noted above, organizations may be comprised of various domains having different syntax patterns. Naturally, different data perimeters may exist for each domain based on accepted usage patterns within the domain, as well as other identifying elements. In some instances, domain may further draw from a global content pool by incorporating industry-wide syntax and grammatical usages that are related to a particular domain. For example, a medical group within an organization may use a different terminology than a financial group within the same organization. In addition, both the medical group and the financial group may employ regulated industry-wide syntax to communicate with other associates within the same field. The syntax patterns of each domain may therefore be expanded based on the global usage pattern, which may be detected through the exchange of messages in some instances. A syntax pattern within a particular domain may also evolve over time, which results in a dynamic data perimeter. The system described is advantageously configured to incorporate such time variant features automatically. Each data perimeter provides an organization with the ability to leverage the machine learning and pattern recognition capabilities of the, e.g., virtual neural network, to quantitatively assess the contents within or associated with a data package while determining the risk level associated with a potential data leakage.

The secure messaging gateway is described in terms of a split-architecture network wherein a separation exists between control and forwarding components within the network. In this way, these elements are decoupled and controlling elements on servers may be in different locations from the forwarding elements. Information collected from controllers may be used to distribute data streams to the appropriate forwarding components via switches. For example, a forwarding table may be populated with entries comprising a rule defining matches for fields in packet headers; an action associated to the flow match; and a collection of statistics on the flow. The use of a split-architecture enables the simplification of switches and shifts the network intelligence into a number of controllers that oversee the switches.

A split-architecture allows for flexible control over data flows across various data streams while enabling optimal message processing based on available system resources. The message processing device may be deployed in a corporate entity that processes messages and transmits the messages processed to one or more destinations. The device performs a cursory evaluation of each incoming message to determine whether a deeper level of processing is necessary based on the content of the message. Then, messages capable of transmission without additional resources and with no perceivable processing delay may be transmitted directly, whereas messages processed using greater resources are directed to a workflow pipeline engine for the more expensive processing at a later stage. Deep processing includes a processing action that reads the body of a message and evaluates an attachment for content. As one example, an e-mail message including no attachments may be processed in substantially real-time whereas a message including one or more attachments may be more thoroughly scanned to assess whether a virus threat exists within the attached files. According to the present disclosure, the exemplary message processing device may thus process these e-mail messages at a deeper level by processing the body of the message and scanning the contents of the attachment, which is performed at a later stage. The result is a low latency system configured for efficient resource management. One advantage of the system described is a high degree of scalability, which results in a readily extendible system whose resources can be increased during periods of high data flow.

In one particular example, the message processing device is a secure message gateway configured to receive messages and transmit the messages received to a destination. According to one embodiment described, the secure message gateway comprises a message engine configured to receive the message from a messaging client; a message parser configured to parse the message and create a metadata header describing properties used to define processing criteria rules for the message; a pipeline requester configured to determine a pipeline identifier from the metadata header based on the processing criteria rules for the message; a workflow pipeline engine configured to receive the message and the pipeline identifier, launch a pipeline based on the pipeline identifier, and create a modified message by passing the message through the pipeline, the pipeline configured to alter characteristics of the message; and a routing engine configured to receive the modified message and transmit the modified message to a destination.

FIG. 1 illustrates an example data flow through message processing device 100, e.g., a secure messaging gateway. Messaging engine 110 within the secure messaging gateway may be configured to receive a message from a client. For simplicity, input data flow 10 comprising input from a plurality of devices 12 is shown flowing into the secure messaging gateway. Once received, messaging engine 110 may quickly analyze each message, and direct the messages according to processing steps to be performed for the message.

For example, a threshold may be included within message processing device 100 that indicates the size of a message. Messages with a larger size may include attachments that present a potential risk for data leakage. Therefore, messages exceeding the size threshold may be scanned at a deeper level, which involves reading the message and scanning the attachment and using increased system resources. Alternatively, messages falling below the size threshold may be processed with no perceivable delay in processing time. The threshold may therefore be selected to indicate whether substantially real-time processing may occur based on message size. As one example, 80% of the messages within input data flow 10 may fall below the size threshold (e.g., less than 10 kbytes) and therefore be processed directly without performing a deeper message scan. The system may directly process and transmit these messages with no perceivable delay in processing time. High volume flow 32 is shown representing the increased data flow directly processed by the system that is directed to routing engine 160 for transmission to a destination. Alternatively, the remaining 20% of input data flow 10 may comprise messages exceeding the size threshold that are to be processed at a deeper level (e.g., size larger than 10 kbytes with an attachment). Messaging engine 110 may be configured to direct these messages into workflow pipeline engine 140, as indicated by low volume flows 34 and 36 entering and exiting the workflow pipeline engine, respectively.

As described in greater detail below, handlers and pipeline requester may be used to schedule the deeper level of processing (e.g., a deep scan), as well as the transmission from the outbound queue. Routing engine 160 may be configured to transmit the messages stored in the outbound queue to a plurality of destinations 22 via output data flow 20. As described herein, the split-architecture may be synchronously operated to allow for input data flows to be processed more optimally based on system resources available. In this way, schedulers and/or handlers may be utilized to coordinate processing activities in the workflow pipeline engine while the directly processed data flow is also coordinated therewith. When configured in this way, messages may be processed in a highly efficient manner for delivery to an intended destination with low latency.

Figure 2:
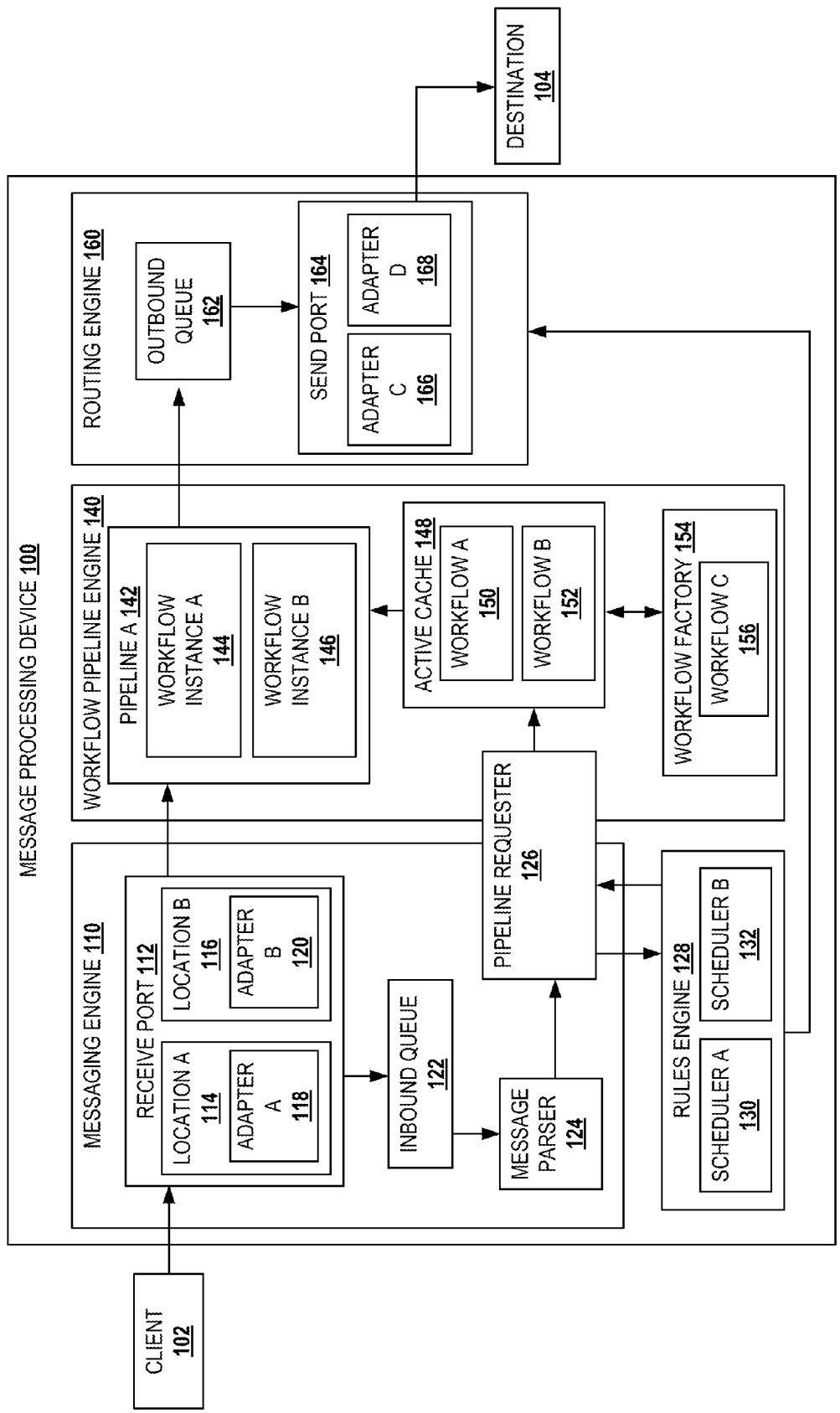
FIG. 2 schematically shows a block diagram describing major components and processes of the system.

FIG. 2 schematically shows a block diagram of message processing device 100 that is described in terms of an exemplary secure messaging gateway. The secure message gateway is configured to receive a message from a messaging client 102 and transmit the message to a destination 104. For example, a plurality of users within a corporate entity may communicate with one another and clients outside of the organization via various messaging protocols (e.g., e-mail, instant messaging, texting, dropbox cloud storage and file synchronization, blogging, voice over IP, etc. . . . ). Message processing device 100 may be configured to process these messages in a protocol independent format for delivery to an intended destination. Moreover, because some messaging formats like e-mail utilize greater system resources than others, a split-architecture message processing device allows for such messages, e.g., message with large attachments, to be scanned at a deeper level, to assess whether a virus is present. In addition, the deep scan can occur at a later stage of processing to conserve system resources.

Scheduling resource intensive tasks for processing at a later time allows a higher volume of messages to be processed on demand using reduced system resources. In this way, the bulk of the data flow may be delivered with no perceivable delay, which allows for efficient system processing. Conversely, messages using a greater portion of the resources are directed to a workflow pipeline engine for more expensive processing that occurs, for example, at an off-peak time when the user demand on the system is reduced.

Message processing device 100 further includes messaging engine 110 that is configured to receive messages from messaging clients. The messaging engine may process messages received regardless of protocol using a message parser 124. Message parser 124 parses each message while creating a metadata header for each message that describes properties used to define processing criteria rules for the message. That is, each message may be processed by a set of rules based on the metadata header created by message parser 124.

Message headers (e.g., cleartext, SMTP, secure mail) may include information such as a message ID. For example, an instant message may include a conversation and message ID that identifies different messages within a conversation. Program logic and/or rules may thus be developed to identify keywords or other information that is used to request specific processing steps. For example, a parser may operate like a bloom filter and identify whether an element is a member of a set based on a probabilistic assessment of the data structure. In some instances, a processing element requested may speed up operations and thereby use available system resources more efficiently.

Based on the processing criteria rules for a message, pipeline requester 126 may further determine a pipeline identifier to attach to the message from the metadata header. For example, an e-mail message having an attachment above a threshold (e.g., greater than 10 Mbytes), may be quickly assessed by rules engine 128 for a deeper level of processing via a virus scan. When an incoming message packet (or data stream) matches a particular rule or set of rules, an associated action may be performed on the packet. A rule contains key fields from several headers in the protocol stack, for example Ethernet MAC addresses, IP address, IP protocol, TCP/UDP port numbers as well as the incoming port number. To define a flow, all the available matching fields may be used. But it is also possible to use rules for a subset of the available fields.

Workflow pipeline engine 140 may be configured to receive messages and a pipeline identifier, and launch a pipeline based on the pipeline identifier. In this way, workflow pipeline engine 140 may perform intensive workflows based on a pipeline identifier. For example, a pipeline identifier may indicate that a deep scan of the e-mail attachment is to be performed. Therefore, workflow pipeline engine 140 may schedule the e-mail scan for a later stage of processing. As another example, a document in an e-mail may include a watermark indicating that the document is not to be widely distributed. As described herein, the document may be quarantine until an administrator (e.g., a legal professional) overrides the quarantine and allows further processing and transmission of the document. As such, in some instances, the processing may be a manual processing performed by a credentialed individual that is trained to perform the inspection. Based on the pipeline identified, in some instances, the workflow pipeline engine may create a modified message by passing the message through the pipeline, the pipeline configured to alter characteristics of the message.

Thereafter, routing engine 160 may be further configured to receive the modified message from the pipeline engine and transmit the modified message to a destination. Alternatively, routing engine 160 may also receive directly processed messages that are transmitted without additional processing in the pipeline.

Returning to messaging engine 110. A receive port 112 is included therein that is configured to receive messages from one or more messaging clients. For simplicity, the receive port includes one or more receive locations (e.g., locations A and B shown at 114 and 116, respectively), although other configurations are possible. Each receive location may further include at least one adapter (e.g., adapters A and B shown at 118 and 120, respectively) that defines a communication method and/or protocol used to connect to and receive data from an external client.

Inbound queue 122 is configured to receive messages from receive port 112 that are further processed accordingly and sent to message parser 124. According to the description provided, the inbound queue may be configured to operate in a stateless manner in which the inbound queue does not require state information from the message processing device in order to receive and send the message to the message parser. Said differently, the inbound queue may process messages independently of data format and or transmission protocol. For instance, messages may be sent over SMTP protocols, HTTP and/or HTTPS (or any other TCP/IP channel) and processed within message processing device 100. Message parser 124 further creates the metadata header by mapping the base components of the message to a standardized message construct.

With regard to the rules engine 128, which may be configured to receive the metadata header from pipeline requester 126 and communicate therewith, a pipeline identifier may be determined based on the processing criteria for the message. As one example, the processing criteria may include one or more content-based keywords or phrases in the message or message line of the header, perhaps in addition to the presence of an attachment, as described above. For example, a lexical analysis of the content of an e-mail message may indicate a pattern to be analyzed at a deeper level in the workflow pipeline engine. Schedulers A and B shown at 130 and 132, respectively, may coordinate the timing of the deeper inspection based on current or expected resource usage. Alternatively, if a message passes the analytical tests provided by the rules engine, the messaging engine or rules engine may be configured to route the message directly to routing engine 160 where the message is incorporated into outbound queue 162 for delivery to the destination. When messages are processed directly, the messages are transmitted with no further modification of the message, which uses additional system resources.

To identify a time when message are to be processed at a deeper level, rules engine 128 may engage one or more schedulers included therein (e.g., scheduler A 130 and scheduler B 132). In this way, a scheduler also referred to as a handler may decide whether additional processing is to be performed via the pipeline, and in particular, the type of processing to be performed. As one example, scheduler A 130 may be configured to identify a message property like origin of message or subject line. Then, based on the message property, the scheduler may request, e.g., a virus scan or other specific task like data encryption and/or malware detection scan. In some instances, a scheduler may be written by a third party, and therefore be a third party API. A system configured according to the present description may flexibly incorporate this scheduler into rules engine 128 for increased processing capability. In other words, scheduler A 130 may be written by a first developer, such as the message processing system host, whereas scheduler B 132 is written by a third party security client that specializes in, for example, virus scanning detection. Subsequent to scheduling, pipeline requester 126 may synchronously direct the messages identified into workflow pipeline engine 140 to perform the resource intensive activities identified.

Resource intensive processing occurs in workflow pipeline engine 140. As noted above, pipeline requester 126 may coordinate and deliver messages to be processed more deeply into the pipeline where various pipelines are engaged or assembled to perform the additional processing steps. A pipeline is a linear series of steps (or stages) that can be executed to more thoroughly process the messages based on an identified criteria. Examples of workflow pipelines include deep virus scans, encryption methodologies and application of messaging filters.

Workflow pipeline engine 140 further comprises active cache 148 that is configured to receive a workflow and pipeline identifier, and to launch the appropriate pipeline from workflows stored in the active cache based on the pipeline identified. For simplicity, two workflows A and B are shown at 150 and 152, respectively. Active cache 148 may be configured to automatically initiate new requests to the update cached file objects or workflows without additional user intervention. In some instances, requests may be activated based on the length of time an object has been cached or was last retrieved from the object's source location.

Pipeline may already exist and be stored within the workflow pipeline engine. When a pipeline already exists, active cache 148 may launch the pipeline and direct the workflow into the pipeline for the additional processing. For example, workflow A and workflow B may be directed into pipeline A 142, which generates two different workflow instances indicated as workflow instance A 144 and workflow instance B 146, respectively. Alternatively, if no workflow exists for a pipeline identified, workflow factory 154 may be engaged that is configured to assemble a pipeline. For this reason, workflow instance C 156 is shown in workflow factory 154. Workflow factory 154 may assemble a pipeline, for example, by invoking a particular collection of files to perform the processing identified by the pipeline identifier. Thereafter, workflow C 156 may be sent back to the active cache for additional processing. After processing, workflow C 156 may be directed to the routing engine 160 for delivery to destination 104. Likewise, workflow instance A 144 and workflow instance B 146 may also be directed to routing engine 160 for delivery to destination 104 after processing in pipeline A 142.

In some embodiments, message processing device 100 may implement a publish-subscribe model to attain workflows that are used during message processing in the pipeline. In this way, the system may be configured to subscribe to one or more personal email networks and, during start-up of the message processing device, obtain one or more workflows published by the one or more personal email networks, the workflows defining the runtime behavior of the message processing device. Workflows obtained may then be stored in the active cache of the workflow pipeline engine for processing based on the pipeline identifier, which may be updated to reflect the available status of the pipeline during message processing. Alternatively, an existing workflow may be modified in the active cache of the workflow pipeline engine based on the workflows obtained from the one or more personal email networks.

Routing engine 160 comprises an outbound queue 162 for receiving modified messages from workflow pipeline engine 140, in addition to unmodified message from rules engine 128, which in some instances may be included within messaging engine 110. Outbound cache may automatically initiate and update cached file objects or workflows without additional user intervention prior to message delivery. Send port 164 includes a plurality of protocol adaptors (e.g., adaptors C and D shown at 166 and 168, respectively) that are configured to connect and transmit the messages to destination 104. In some instances, routing engine 160 may be configured to send messages over different adapters and via different protocols than received. In this way, message processing device 100 may be agnostic to protocol format.

Figure 3:
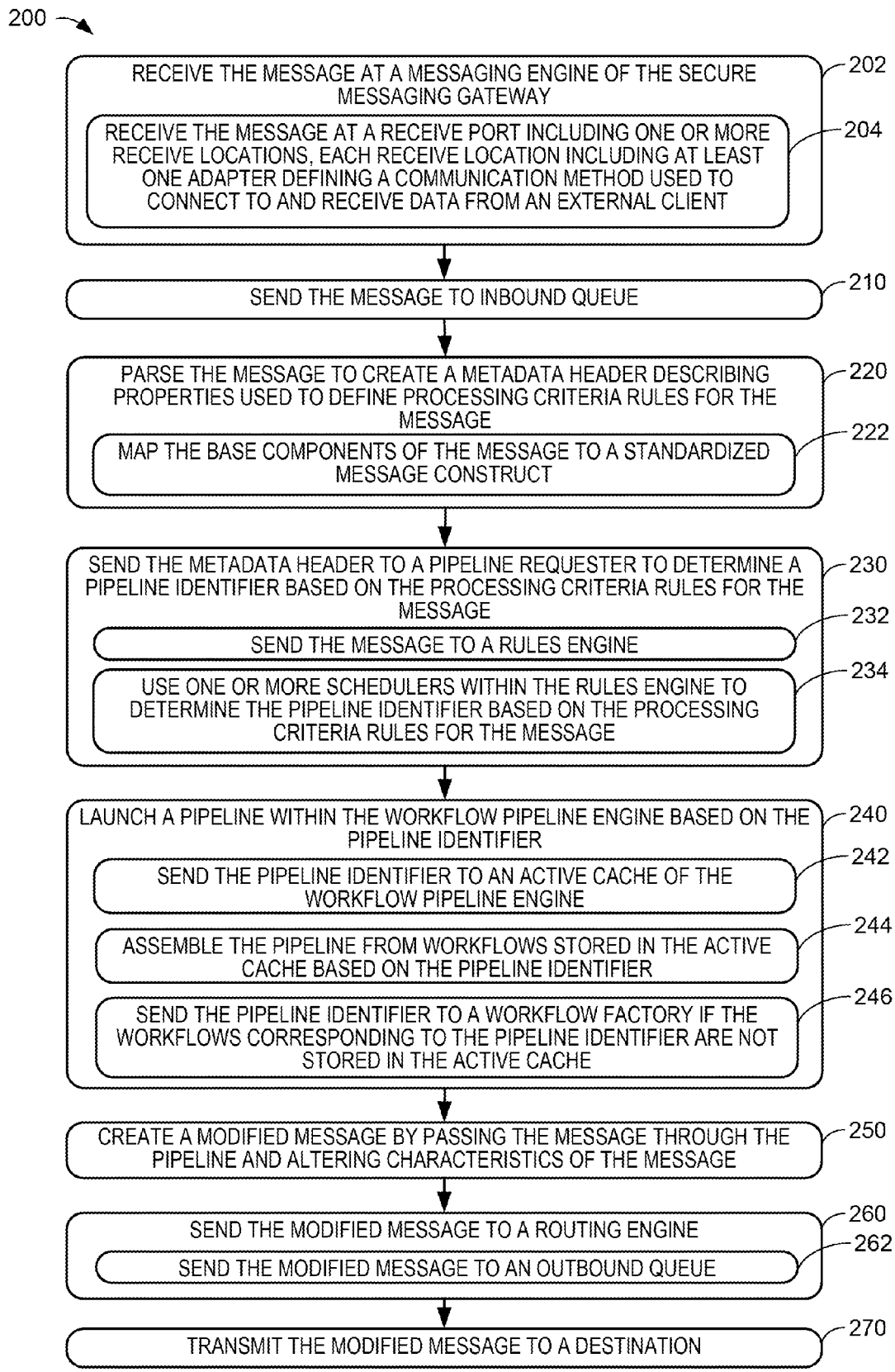
FIGS. 3 and 4 show example flow charts illustrating process flows for the example system of FIG. 2.
Figure 4:
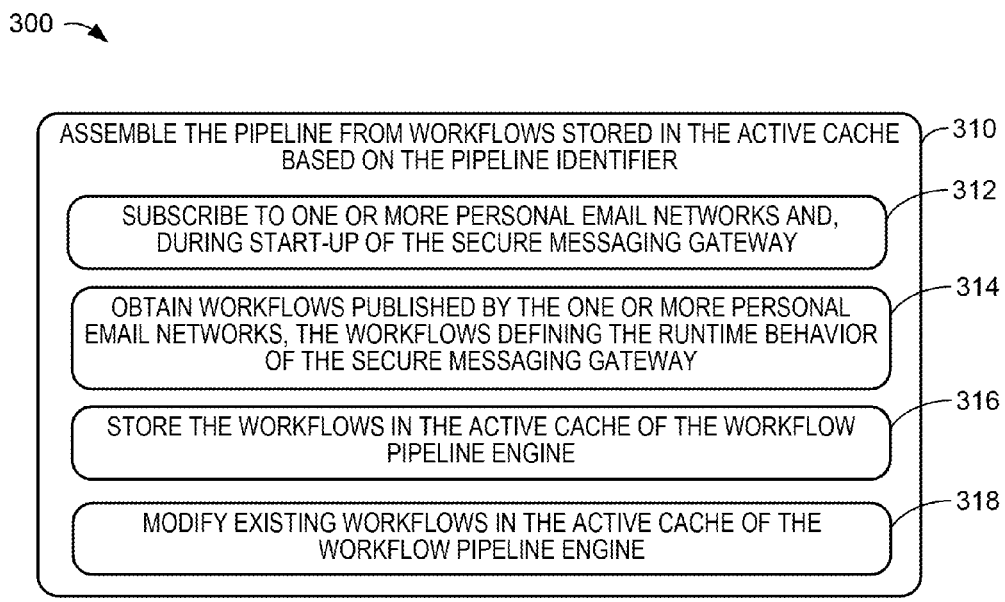

Turning to a description of the methods enabled by such a system, FIGS. 3 and 4 show example flow charts illustrating process flows for processing the data according to an example system according to the present disclosure.

FIG. 3 shows method 200 for processing a message in message processing device 100, e.g., a secure message gateway. At box 202, method 200 includes receiving the message at a messaging engine of the secure messaging gateway. For example, at box 204, method 200 includes receiving the message at a messaging engine of the secure messaging gateway and further comprise receiving the message at receive port 112 including one or more receive locations (e.g., 114 and 116), each receive location including at least one adapter (e.g., 118 and 120) defining a communication method used to connect to and receive data from an external client, such as plurality of clients 12.

At box 210, method 200 includes sending the message to an inbound queue, such as inbound queue 122.

At box 220, method 200 includes parsing the message to create a metadata header describing properties used to define processing criteria rules for the message. For example, the base components of the message may be mapped to a standardized message construct, as shown at box 222.

At box 230, the method further includes sending the metadata header to a pipeline requester to determine a pipeline identifier, the pipeline identifier determined based on the processing criteria rules for the message. At 232, the method further comprises sending the message to a rules engine for processing based on the processing criteria rules. If a message is to be processed at a deeper level, one or more schedulers within the rules engine may be engaged to determine the pipeline identifier based on the processing criteria rules established for the message, as shown at box 234. In this way, the method may include sending the message and pipeline identifier to a workflow pipeline engine. However, if further processing is not to be performed, method 200 may alternately transmit the message to an intended destination without modifying the message.

However, if deeper processing is identified, method 200 may include launching a pipeline within the workflow pipeline engine based on the pipeline identifier, as indicated at box 240. Launching a pipeline comprise sending the pipeline identifier to an active cache of the workflow pipeline engine along with the message to be processed, as indicated at box 242. In some instances, launching the pipeline may include assembling the pipeline from workflows stored in the active cache based on the pipeline identifier, as indicated at box 244. However, in other instances, launching a pipeline based on the pipeline identifier may include sending the pipeline identifier to a workflow factory if the workflows corresponding to the pipeline identifier are not stored in the active cache, as indicated at box 246.

Turning momentarily to FIG. 4 illustrating method 300 for assembling the pipeline, box 310 shows that the pipeline may be assembled from workflows stored in the active cache based on the pipeline identifier. For example, at box 312, method 300 may include using a subscription to one or more personal email networks, and during start-up of the message processing device (e.g., secure messaging gateway), obtaining workflows published by the one or more personal email networks, the workflows defining the runtime behavior of the secure messaging gateway, as shown at box 314. In this way, method 300 includes storing the workflows obtained in the active cache of the workflow pipeline engine. Alternatively, box 318 shows that method 300 may include modifying existing workflows in the active cache of the workflow pipeline engine.

Returning to FIG. 3, at box 250, method 200 includes creating a modified message by passing the message through the pipeline and altering characteristics of the message. Then, at box 260, method 200 further includes sending the modified message to a routing engine. Sending the modified message to a routing engine comprises incorporating the message into an outbound queue as shown at box 262, and sending the modified message to a protocol adapter within a send port, the protocol adapter configured to connect and transmit the modified message to the destination, as indicated at box 270.

Figure 5:
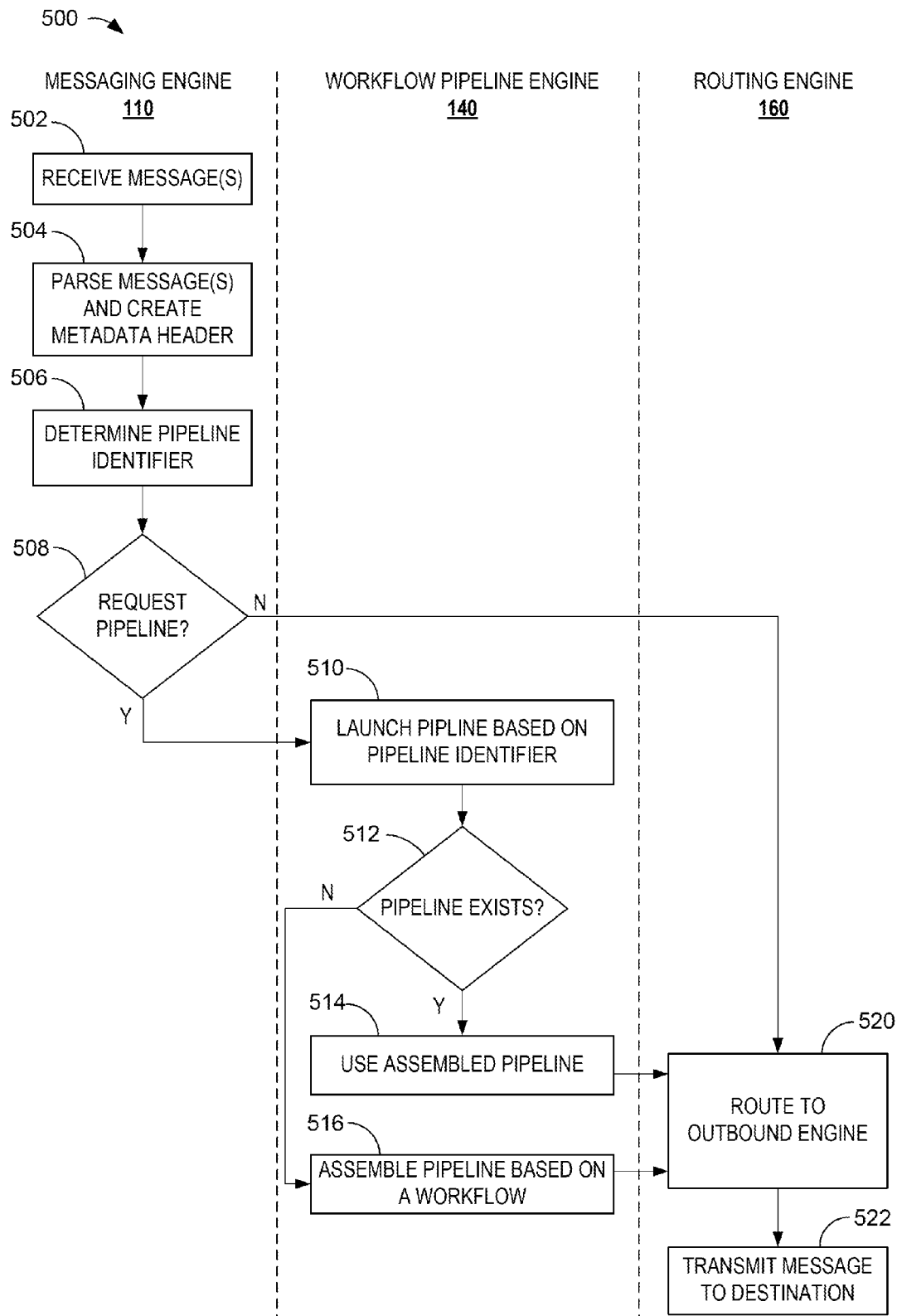
FIG. 5 shows an example flow chart for managing the data flow of the example system.

FIG. 5 shows an example flow chart 500 illustrating the flow of within the secure messaging gateway. Flow chart 500 also referred to as method 500 provides a method for processing a message upon entering the secure message gateway. At 502, the method comprises receiving the message at a messaging engine of the secure messaging gateway, wherein receiving the message further comprises receiving the message at a receive port including one or more receive locations, each receive location including at least one adapter defining a communication method used to connect to and receive data from an external client. Thereafter, method 500 includes sending the message to an inbound queue configured to process messages based on an identifier associated with the message.

At 504, the message is parsed to create a metadata header describing properties that define processing criteria rules for the message, the message parsing further comprising mapping the base components of the message to a standardized message construct. At 506, method 500 includes determining whether a pipeline identifier exists to execute the additional processing indicated via the workflow pipeline engine. For this reason, decision block at 508 is included and determines whether a pipeline is to be requested or the message processed directly. For example, a metadata header may be sent to a pipeline requester to determine a pipeline identifier based on the processing criteria rules for the message, wherein determining the pipeline identifier further comprises sending the message to a rules engine in some instances. Therein, one or more schedulers may be used to determine the pipeline identifier based on the processing criteria rules for the message.

If a message can be processed directly without requesting the pipeline, which uses additional system resources, the message may be directed to routing engine 520 where it is incorporated into the outbound queue. At 522, method 500 further includes transmitting the messages to a destination based on an ordering in the outbound queue. When messages received bypass the workflow pipeline engine, modifications of the messages do not occur. Therefore, a message received may be processed directly and transmitted to a destination with no perceivable delay in processing. During periods of high volume data flow, additional processing resources can be brought online and incorporated into the secure messaging gateway to help with the increased data flow.

Returning to decision block 508, if a pipeline identifier indicates that a message is to be processed via the workflow pipeline engine, at 510, the method includes launching a pipeline within the workflow pipeline engine based on the pipeline identifier. Launching the pipeline comprises sending the pipeline identifier to an active cache of the workflow pipeline engine. By passing the message through the pipeline, a modified message may be created by altering one or more characteristics of the message. If the pipeline exists, at 512, the method may using an assembled pipeline to process the message, as indicated at box 514. Alternatively, if a pipeline does not exist, a pipeline may be assembled based on the workflow, as indicated at box 516.

Assembling the pipeline from workflows stored in the active cache based on the pipeline identifier may comprise subscribing to one or more personal email networks and, during start-up of the secure messaging gateway; obtaining workflows published by the one or more personal email networks, the workflows defining the runtime behavior of the secure messaging gateway; storing the workflows in the active cache of the workflow pipeline engine; and/or modifying existing workflows in the active cache of the workflow pipeline engine. In some instances, the pipeline identifier may be sent to a workflow factory if the workflows corresponding to the pipeline identifier are not stored in the active cache. A workflow factory may be used to create a pipeline on demand based on the pipeline identifier.

As described above, the modified message is then directed to routing engine 520 and incorporated into the outbound queue for transmission to the intended destination. At 522 the method further includes transmitting the modified message to a destination based on an established ordering in the outbound queue.

Figure 6:
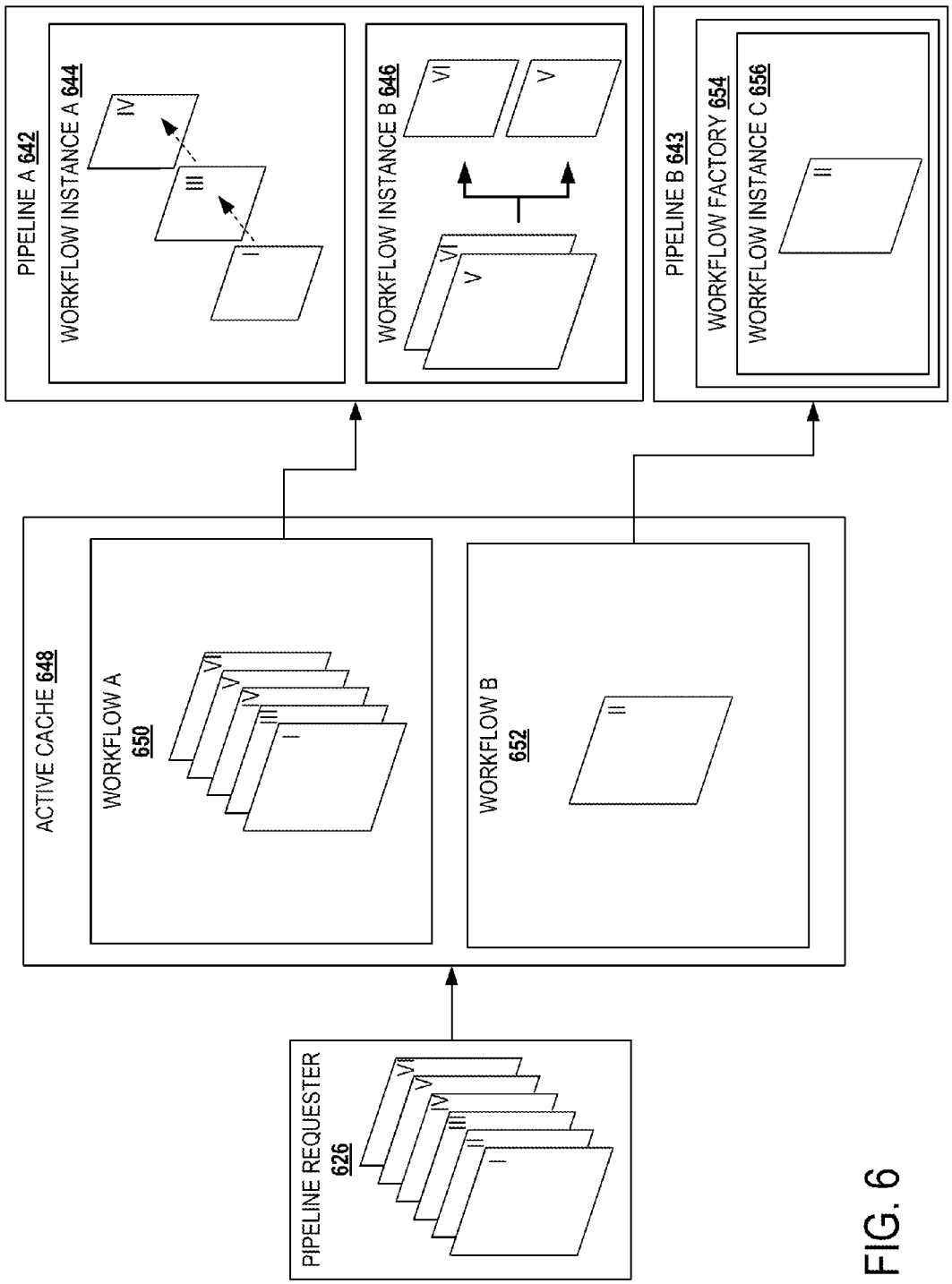
FIG. 6 illustrates an exemplary data flow directed to the workflow pipeline engine.

FIG. 6 illustrates an example pipeline data flow that occurs in the workflow pipeline engine. For simplicity, six messages denoted I to VI are identified for additional processing and stored in pipeline requester 626. These files include metadata headers from which pipeline identifiers are identified to indicate the pipeline to be used for processing the messages in the workflow pipeline engine. In this way, the pipeline requester may compile requests and construct the various pipeline workflows for further processing. In some instances, messages to be processed in the workflow pipeline engine may be disparate in origin, and come from different places, and via different protocols, but be processed in a single workflow pipeline. Alternatively, a default workflow (e.g., virus scan) may exist based on workflow rules that are executed upon request.

Upon entering the workflow pipeline engine, the six files are sent to active cache 648 that receives the workflow and pipeline identifier, and further launches the pipeline from workflows stored in the active cache based on the pipeline identifier. Active cache may automatically initiate new requests to update cached file objects or workflows without additional user intervention. Two example workflows A and B are shown at 650 and 652, respectively. Example workflow A 650 includes files I, III, IV, V, and VI, whereas workflow B 652 includes file II. Pipelines A and B are shown at 642 and 643, respectively, and may be launched for processing workflows according to the determined schedule and system resources used. Workflow A 650 is directed to pipeline A 642 whereas workflow B 652 is directed to pipeline B 643.

Exemplary pipeline A 642 is shown executing two different workflows. Workflow instance A 644 schematically illustrates serial processing wherein files I, III, and IV are efficiently processed in series, for example, because the files have a smaller size. Alternatively, workflow instance B 646 schematically illustrates execution via parallel processing wherein files V and VI are shown simultaneously processed. For instance, files V and VI may be large and so benefit from parallel processed to be expeditiously processed. As noted above, file scanning pipelines may already exist and reside in the workflow pipeline engine, which is indicated in pipeline A 642.

Exemplary pipeline B 643 illustrates an example where the pipeline does not reside in the workflow pipeline engine. Thus, the pipeline is first assembled before processing of the message occurs. For this reason, pipeline B 643 includes workflow factory 654. In some instances, the pipeline identifier may be sent to a workflow factory if the workflows corresponding to the pipeline identifier are not stored in the active cache. A workflow factory is used to create a pipeline on demand based on the pipeline identifier. Thereafter, workflow instance C 656 shows file II being processed using the assembled pipeline. Thereafter, each of the files shown (e.g., I through VI) may be routed to the outbound queue and for transmission to the destination.

Figure 7:
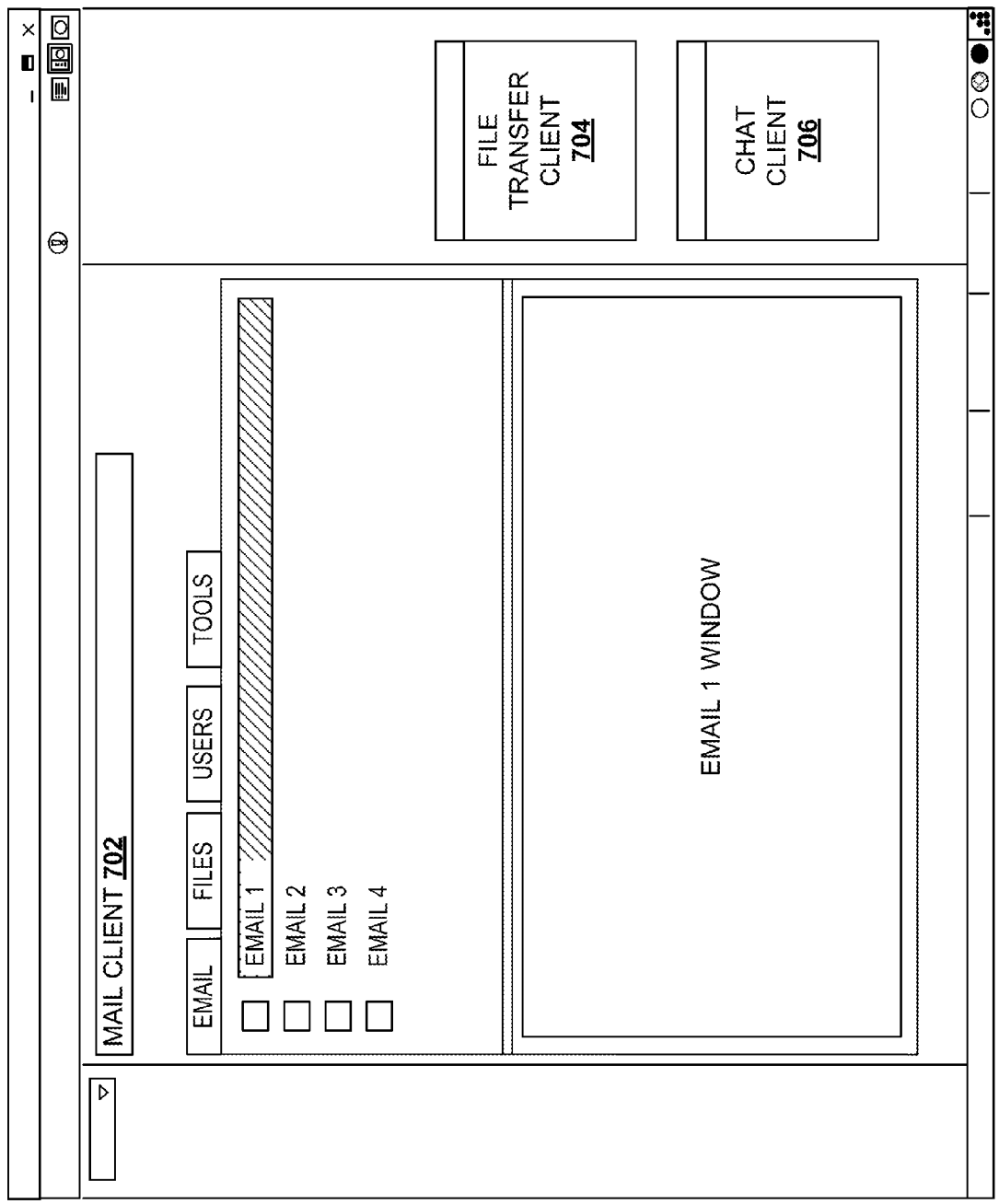
FIG. 7 shows an exemplary user interface for sending messages via the processing device during operation.

FIG. 7 shows an example UI 700 for use with the message processing system. Because messages are processed independently of format or protocol, the interface includes three different messaging clients being simultaneously engaged for use with the system according to the present description. For example, mail client 702, file transfer client 704 (e.g., FTP), and chat client 706 may be used simultaneously. The e-mail client may be used for creating, exchanging, and viewing e-mail messages. Existing e-mail clients include MS Outlook, Eudora Mail, and Lotus Notes. As used herein, an e-mail client refers to any program (e.g. PC-based, web-based, PDA-based, etc.) that allows for the creation and management of e-mail messages though existing e-mail protocols such as SMTP. Instant messaging (IM) is a type of online chat that offers real-time text transmission over the Internet (e.g., HTTP or HTTPS). Short messages are typically transmitted when a user selects "send". As described above, the secure messaging gateway may be configured to receive messages independent of format or protocol for transmission to a destination.

In this way, a cursory evaluation or quick scan may be performed that inexpensively assesses the various properties of a message without accessing additional lookups. Thus, the system may minimize external resources used for processing high volume data flows in some instances. Early inexpensive assessments provide for a simple processing without invoking additional resources of the system. Then, deeper scans and processing steps may be scheduled and performed at a later stage based on the available system resources. As one example, an e-mail transmission lasting a few hundred milliseconds may be processed with no appreciable slowdown in transmission speed. Thus, the surface level evaluation of the message properties allows for quick processing without opening attachments or performing deeper level activities while triggers for the deeper scan are sought. In a deeper scan is not triggered, the system may perform the quick scan only, and simply transmit the message to a destination without using additional resources, which allows for the resources of the system to be optimized with respect to data flow and usage.

Turning to the data leak protection system using the example of the secure messaging gateway described above, FIG. 8 shows an example data leak protection system 800 wherein the data leak protection system comprises one of the schedulers within rules engine 128. Although shown within rules engine 128, in other implementations, the data leak protection system may be a stand alone unit positioned in the data stream to process each data transmission. However, as shown, and described in greater detail above, messages processed in messaging engine 110 are directed to rules engine 128 for a more detailed analysis and additional processing. Thereafter, a message may either be directed to routing engine 160 or back to messaging engine 110, and more specifically to pipeline requester 126 (not shown) before being directed into workflow pipeline engine 140 for the additional processing.

Data leaks may be problematic in messaging systems such as instant messaging clients or e-mail servers that process hundreds of millions to billions of messages daily, particularly when identifying and preventing potential losses of confidential information relies upon ambiguously classified content. For example, when deployed within an organization, a message processing device may be presented with a myriad of contextual criteria that may used to classify content for imposing a desired action on a message (e.g., blocking, encrypting, and/or storing for future considerations, etc.). The data leak protection system disclosed advantageously uses machine learning to identify and refine stored parameters continually based on processing feedback to enhance the accuracy of decision-making protocols within the vast interconnectivity of the example messaging environment. Inclusion of machine learning principles allows the leak protection platform to update and improve over time, which introduces the possibility of reducing the complexity of resources used when managing the data leak protection system. In this way, continued deployment of the DLP system leads automatically to a reduction of false positives and thereby saves time and money in an organization's security enforcement.

Figure 8:
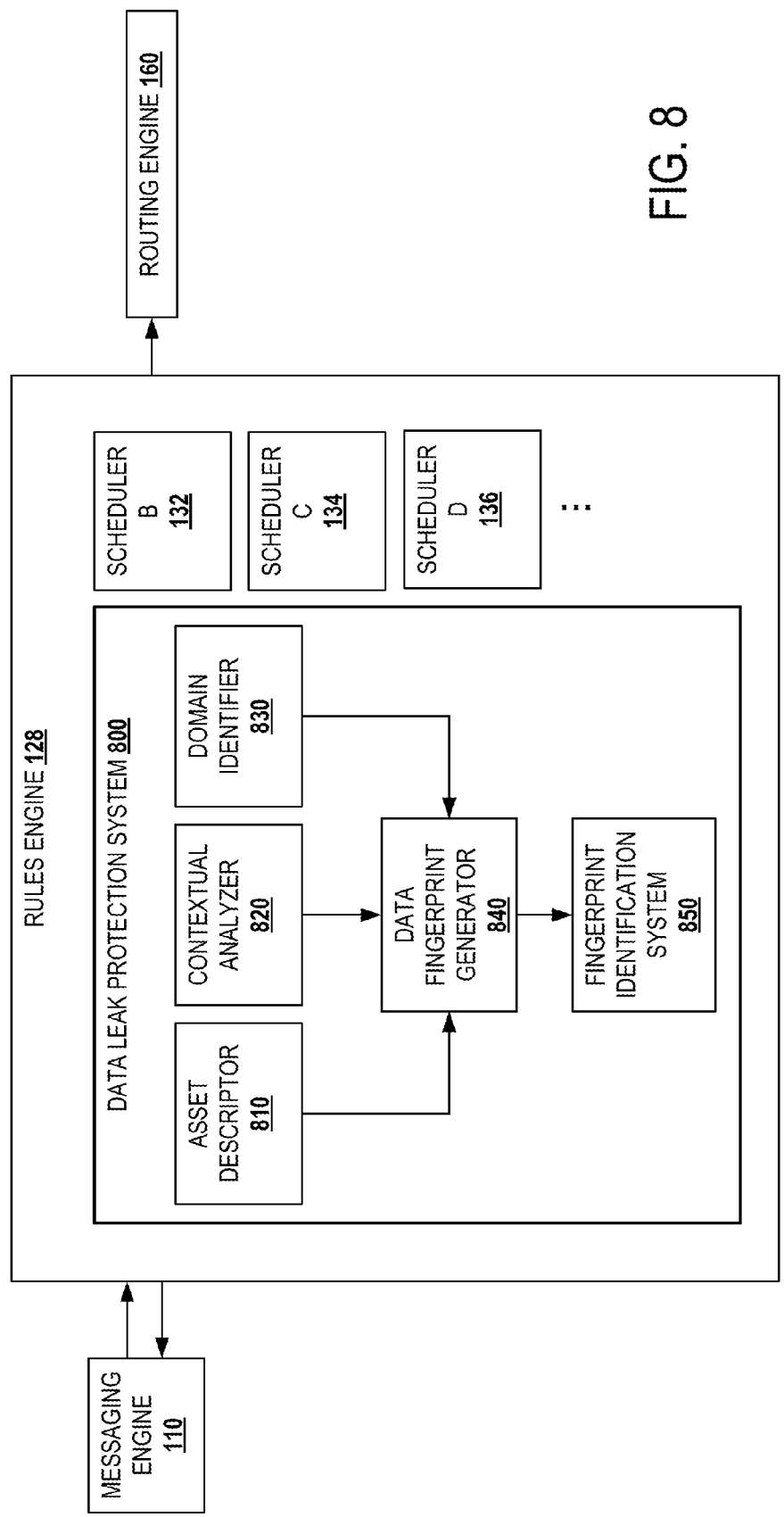
FIG. 8 shows an example data leak protection system according to the present disclosure using the example secure messaging gateway of FIG. 2.

DLP system 800 may rely upon one or more rules to assess and ratify messages prior to message transmission. For this reason, the data leak protection system is shown in FIG. 8 as a component of rules engine 128. However, although described with respect to the message processing device or secure message gateway, in other embodiments, DLP system 800 may alternatively be a stand-alone device placed within a data stream that is configured to leverage the disclosed machine learning methods to protect against the transfer of undesirable data, referred to herein as a data leak.

Digital content fully or at least partially meeting a defined set of rules may be subjected to further actions. For example, herein, the action taken is a quarantining action that suppresses transmission of the message until an Administrator can be notified and performs a visual inspection of the potential data leak. However, the action taken may additionally or alternatively include auto-encryption of the message using a gateway product. For example, as described in greater detail above, the digital content may be directed to workflow pipeline engine that perform an additional action like auto-encryption based on a scheduled priority, which may advantageously account for system resources available. As one example, if a message is identified for a quarantining action and further visualization by a human administrator, a workflow pipeline may be invoked that holds the data package in a secure environment while performing no additional transmissions of the data package. Thereafter, the quarantined data package may be assessed via human inspection and the message delivered based on a determination made by the human intervention. In other words, an example workflow pipeline may be configured as a storage cell where a message is directed for further administrative review.

For simplicity of description, DLP system 800 is shown in place of scheduler A 130 along with schedulers B 132, C 134, and D 136, etc. These schedulers may provide alternate or additional analysis, and may represent a private or subscription based third-party product employed within the secure messaging gateway. DLP system 800 may thus be configured to flexibly incorporate with other functional features available during data transmission events. To uniquely characterize a message, DLP system 800 uses lexical analysis techniques and a global neural network functionality to continually evolve predictive capabilities during deployment based on feedback generated from potentially each and every data transmission event. For example, a cryptographic hash function may be generated that represents a digital signature or message authentication code that is used to populate a data table or library that allows for increased predictive capabilities. With this capability, DLP system 800 represents a sentient and proactive extension of an organization's overall cyber protection policy, rather than as a security tool with a limited scope that may be a drag on organizational resources.

Separate micro- and macro-level edification processes contribute to the enhanced value of the data leak protection system, whether deployed in an isolated digital environment like a home network or on an organization's network to fine tune regulatory compliance policies within the organization or within a supply chain or industry vertical. Said differently, the digital leak protection system according to the present disclosure may provide Information Security 24/7/365 (e.g., 24 hours per day, 7 days per week, 365 days per year) to defend data perimeters and thereby help make smarter business decisions. Automation of the learning process further allows for the adoption of "best-practices," even on an industry-wide scale that allows an organization to increase the amount of time spent on business activities like the growing of the business.

DLP system 800 uniquely characterizes each message or data package before the subsequent analysis. In this way, DLP system 800 is a data leak protection system configured to identify and analyze a digital fingerprint for a data package, the system comprising a digital fingerprint generator for identifying the digital fingerprint based on a corpus of data within the data package, and characterizing the data package based on the digital fingerprint, the digital fingerprint generator further comprising an asset descriptor for identifying one or more assets within the corpus of data; a contextual analyzer for framing the one or more assets into a prevailing contextual environment identified for the data package; and a domain identifier for identifying a data perimeter based on the one or more assets and the prevailing contextual environment. As described, the data leak protection system further comprises a fingerprint analyzer configured to compare the identified digital fingerprint for the data package to a collection of domain specific identifiers, each domain specific identifier characterizing the identified digital fingerprint in one or more domains; and a processing gateway configured to trigger a data leak notification when the identified digital fingerprint falls outside of a data perimeter for the one or more domains.

Asset descriptor 810 is herein described as a processing unit configured to process documents and messages to create a consistent definition of the information to be used for further analysis while anonymizing the digital content to protect the privacy and confidentiality of the package contents. As such, in some instances the Asset Descriptor may produce a secure data sheet that comprises context triggered piecewise hashes (e.g., Fuzzy Hashes) and varying degrees of statistical, contextual, and lexical analyses of the document, message, or other digital assets (e.g., financial spreadsheet). Upon initial generation (particularly in the background analysis and training stages), asset descriptors may gather large quantities of detailed information to assess data connections within each document analyzed. However, in real-time operations Asset Descriptors perform source transformations while keeping the fuzzy hashes for further analysis. Real-time processing and model training on the Fuzzy Hashes may be used to form a digital information fingerprint (DIF) that may be combined with a contextual information fingerprint (CIF) in some instances to form the patterned analysis. Asset descriptor anonymity increases as the metadata initially used to pre-process the source data is removed, leaving only the context triggered piecewise hashes and processing metadata. Safe processing of Asset Descriptors outside the network of an organization (e.g., a private network) may become viewable based on the use of suitable security protocols that protect valuable information from various forms of attack.

Contextual analyzer 820 is further included and forms another component capable of generating digital content to be accounted for when generating the digital fingerprint. While assets may be relatively static over the course of time, contextual usages evolve and change constantly. For this reason, the contextual environment forms another element that is used to identify and analyze the digital fingerprint. Context or contextual meaning refers to the various parts of a written (e.g., digitized as part of the data package) or spoken statement that precedes, follows, or otherwise surrounds a specific word, phrase, or passage (e.g., like a digital asset) and influences its meaning or effect. In this sense, accounting for and including contextual indicators in the analytical framework increases the sensitivity of detection, and further enhances the information security that is relied upon to make effective business decisions regarding the movement of assets. As one example, a company director may routinely share sensitive documents with other individuals occupying positions at the director level; however, when that director sends confidential documents to a personal email address, suspicion may arise that represents a potential data leak. As another example, a firm representative from the legal department of an organization may have the clearance to send documents with a "do not distribute" watermark; however, when a person from human resources without the appropriate clearance attaches the document with the "do not distribute" watermark, a potential data leak may be in the process of occurring. Combining the identification of assets with a contextual analyzer provides a rich data mining tool for uncovering potential patterns of data leakage.

Domain identifier 830 is included for identifying a data perimeter based on the one or more assets and the prevailing contextual environment. Herein, domain descriptor 830 may be configured to identify one or more domain descriptors indicative of a lexical domain within an organization. Large corporations, businesses or organizations may include a plurality of departments having various functionalities, perhaps even divisions of the same company, and so vary tremendously. Accordingly, the vocabulary used may also vary across the departments and/or divisions, and/or units, and/or subgroups. For instance, a pharmacy may regularly include the various names of medicines in business correspondence, but the vocabulary used by an accounting office may appear starkly different in their business correspondence. In other words, the normal colloquial vocabulary used may be different for different domains within an organization, and also across industries. Domain descriptors may represent a type of contextual corpus that comprises information that may be used to refine asset descriptors by refining the domain in which the asset descriptors exist. For example, domain descriptors may include one or more lexicons and so include various rules and policies for their interpretation. In one implementation, the domain descriptors may be implemented as processing stages aggregate the data to create processing pipelines capable of transforming and refining one or the other or both of the Context and Asset Descriptors before the models are trained. In addition, domain descriptors may also include configurational data that is used to configure the deep neural networks used by DLP system 800. In this way, the domain descriptors may serve to focus the identified asset descriptors based on the contextual environment identified so meaningful comparisons are made during deployment.

The digital information from at least one of asset descriptor 810, context analyzer 820, and domain identifier 830 may be used to generate a digital fingerprint for a data package. Digital fingerprint generator 840 thus receives a corpus of digital information and further transforms data therefrom into the unique pattern that is used for identifying the digital fingerprint based on the corpus of data within the data package, which allows a characterization of the data package based on the digital fingerprint. For example, digital fingerprints may comprise a collection of domain specific identifiers that characterize an asset descriptor in one or more domains. Individual DIF entries are fixed length digital bit arrays that express asset characteristics in a particular domain, as expressed by fingerprint identification system 850 that is herein described in terms of a Deep Neural Network. A message DIF represents a collection of all the entries that collectively characterize asset descriptors across one or more domains. The DIF represents a fundamental block that DLP system 800 uses to express patterns and thereby supports decision making as well as policy enforcement.

The system may additionally or alternatively be further configured to generate a contextual fingerprint (CIF). Thus, in some embodiments, the data leak protection system further comprises a contextual fingerprint generator for characterizing one or more contextual patterns within the data package, the fingerprint analyzer configured to compare a contextual fingerprint identified for the data package to the collection of domain specific identifiers, each domain specific identifier being further configured to characterize the contextual fingerprint in the one or more domains. For example, the contextual fingerprint may be a component of digital information fingerprints that represent the assessment of the context surrounding the assets, and therefore informing DIFs. CIFs express patterns that are not particular to the content of the digital assets. In this sense, each DIF has an associated CIF that may be used to inform the context of the DIF and thereby further assist in pattern analysis and decision making. However, in the simplest implementation, a DIF may be generated within a contextual environment that provides the information for characterizing the data package. Within a corporate organization, deployment of the system according to the present disclosure may serve to replace one or more teams of full-time employees that pore over digital information to continually update rule sets, analyze contextual usage, and expend large amounts of energy to increase the data infrastructure that merely fuels the ever growing workload.

Figure 9:
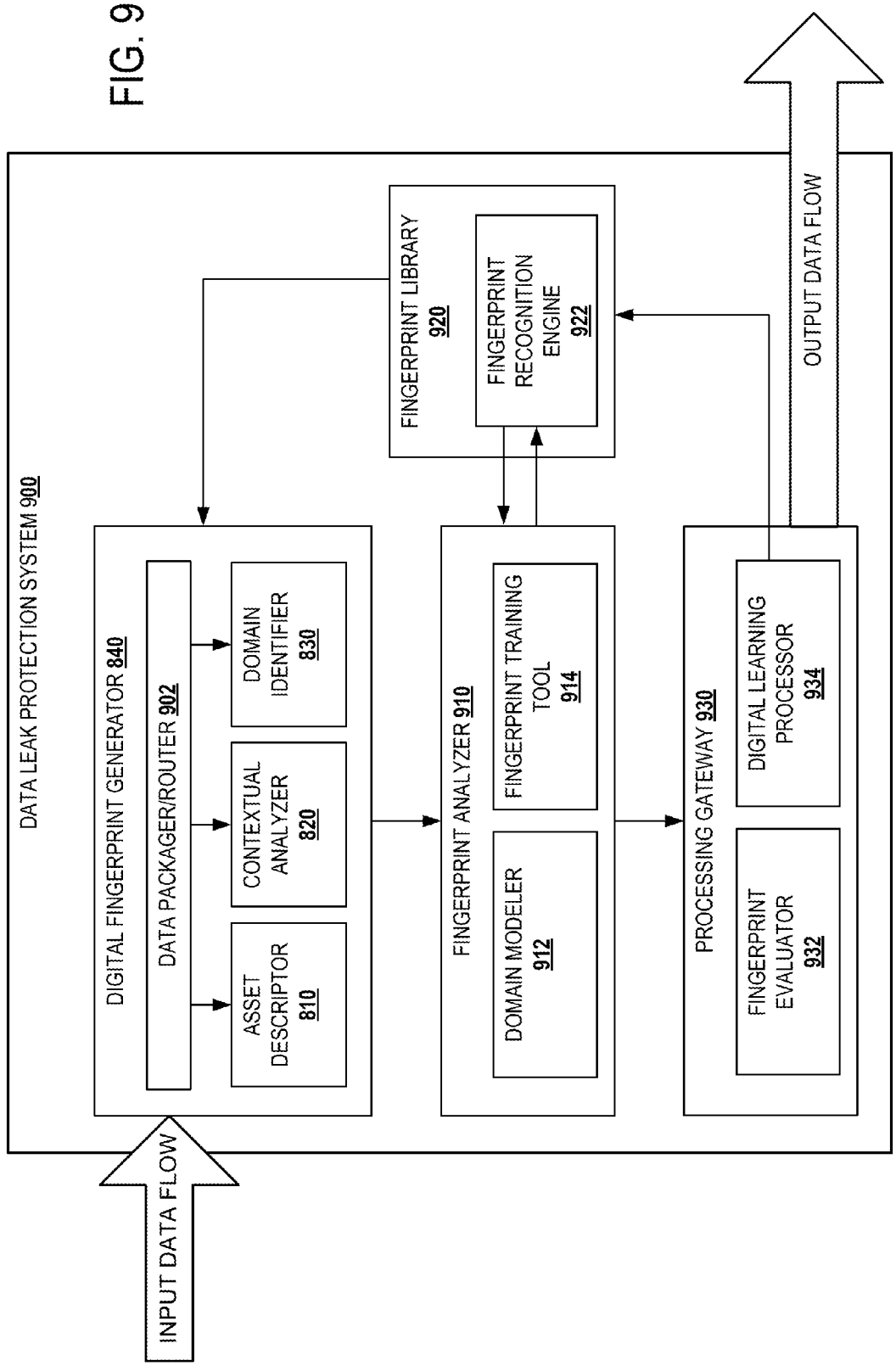
FIG. 9 schematically illustrates an example data leak protection system in greater detail along with example data flows according to the present disclosure.

FIG. 9 schematically illustrates an example data leak protection system in greater detail along with example data flows. DLP system 900 is configured to rely on artificial intelligence and machine learning to increase information security and is thus different than existent automated surveillance techniques that may place increased burdens on organizational resources in some instances. For example, according to the description provided, DLP system 900 is configured with an ability to map relationships between the parsed content within data message, individuals (e.g., senders and recipients), and meta-data related to the messages that is used to generate a global content pool related to organizational resources. The advantage of the system described is that global content pool may further incorporate and/or relate to industry-wide syntax and grammatical usages and thus expand based on the data stream therethrough. Then, to provide digital information security, the data leak system may draw from the global content pool to assess potential data leaks while learning and evolving over time. In other words, a data leak protection system according to the present disclosure may establish a data perimeter beyond which potential data leaks occur.

A data perimeter provides an organization with the ability to leverage the machine learning and pattern recognition capabilities of the, e.g., virtual neural network, to quantitatively assess the contents within or associated with a data package while determining the risk level associated with a potential data leakage. With this arrangement, data protection may be inverted from a frenetic reactive activity to an evolving business intelligence tool. As noted above, organizations may be comprised of various domains having different syntax patterns. Naturally, different data perimeters may exist for each domain that are based on a plethora of factors. In addition, a syntax pattern within a particular domain may evolve over time, which further results in the data perimeter being a dynamic parameter. The system described is configured to automatically incorporate such time variant features.

For simplicity, DLP system 900 is illustrated processing data information (e.g., a data package) in three cycles. The three cycles are (1) data collection and DIF generation; (2) DIF analysis and library training; and (3) gateway processing. Although the data leak protection system herein is described in terms of a real-time processing feed or data flow, this is non-limiting and alternate approaches may also be employed in other processing scenarios. For instance, bulk messages stored in an archival database may also be processed while protecting secure information; or a network may be crawled to organize and manage resources while training models for use in later analysis.

With respect to the first cycle, data collection and DIF generation occurs in digital fingerprint generator 840. In order to build the various time variant relational models, DLP system 900 generates a digital fingerprint for each data package that is subsequently analyzed for specific content and mapped relationships. In some instances, this activity may be performed over a broad range of documents and messages such that a large amount of source data is generated and used to build a robust library rich in domain specific information. Increased amounts of data may lead to increased relational connectivities, which enhances model sensitivity when identifying potential data leaks based on the data perimeters. As described above, every document, message or data package is parsed and processed into asset descriptors (e.g., at asset descriptor 810) to create more uniform representations of the various information assets owned by an organization.

Contextual analyzer 820 further generates context descriptors for indicating or pointing to contextual patterns associated with the identified asset descriptors. For example, data packages may be processed into context triggered piecewise hashes for further comparison. However, different companies or types of companies may have vastly different legal and organizational ways of understanding and valuing information.

To this end, DLP system 900 further includes domain identifier 830 that can be used in parallel (e.g., as shown) or stacked (not shown) to identify domain descriptors that transform asset descriptors before context triggered piecewise hashes are computed. Transformation of asset and/or context descriptors into particular domains allows a more appropriate domain specific analysis that increases the ability of DLP system 900 to identify potential leaks based on data transmissions falling outside of the normal expected usage patterns.

When deployed, in some instances, the data leak protection system may thus collect data during an initial processing stage that generates an initial pool or seed set of asset descriptors that are then used to build out the organizational model. For this reason, data collection and processing is an on-going activity that serves to identify and update common syntactical usages in a domain specific manner since asset descriptors may be expanded and updated regularly. In some instances, domain descriptors that more accurately describe the context of an organization may serve to increase the accuracy of asset descriptors identified and thereby the utility of the system when identifying potential data leaks.

With respect to the second cycle, DIF analysis and library training occurs in fingerprint analyzer 902. Once a well-organized collection of asset descriptors and domain descriptors is available, data flow proceeds to the next step of the process where a model is trained. In other words, once a digital fingerprint is generated, the fingerprint may be analyzed by the data neural network analyzer that mines the identified information for newly formed relationships while updating the information stored in fingerprint library 920. For example, each applicable domain descriptor stack, which is effectively a domain for which a model will be trained, is used to update fingerprint recognition engine 922 within the fingerprint library. Context descriptors provide further contextual information that is used in the pattern analysis.

The fingerprint analyzer includes domain modeler 912 for transforming the asset descriptor into a sole domain prior to the identification of the one or more assets within the corpus of data. However, in some instances, the domain modeler may be used for predicting one or more relationships in the organizational domains stored in the fingerprint library. In this way, a potential data leak may be identified through a contextual domain-specific usage even though a different and possibly unknown syntactic usage is identified.

Training occurs in fingerprint training tool 914. The fingerprint training tool identifies new associations between assets and domains, and incorporates the newly identified associations into the fingerprint recognition engine. As described, the fingerprint training tool is configured to perform training in two stages, the two stages comprising a first unsupervised stage wherein the training is based on unknown data structures within at least one of the data package and the fingerprint library; and a second supervised stage wherein the training is based on known structural relationships within at least one of the data package and fingerprint library. In some instances, both stages can be performed incrementally so new descriptors are identified. The supervised training may include historical results that serve to fine-tune the model prior to real-time processing.

The third cycle represents the gateway processor shown as processing gateway 930 where real time processing occurs in some implementations. Although the processing is described as a occurring in real-time herein, in some implementations, the processing may alternatively occur in other ways. For example, the data leak protection system may be used while processing an archival database to identify where a potential data leak occurred. As such, the data leak protection system may be configured to process messages while identifying, analyzing and refining data fingerprints based on messages stored in the archival database. Then, a processing queue may be relied upon at the gateway to process the messages before being output from the data leak protection system.

Processing gateway 930 may be configured to make a determination as to whether a data fingerprint falls within an expected range based on one or more identified parameters, such as the one or more asset descriptors. For example, processing gateway 930 may include fingerprint evaluator 932 for estimating an extent that the identified digital fingerprint falls outside of the data perimeter for the one or more domains. In some implementations, a defined flat set of rules may be applied to a piece of communication to determine whether a risk of data leakage is present based on the message contents. If so, the message may be ratified, for example, by a manual intervention of the message contents before successful delivery of the message is made. Content fully or partially meeting an identified rule set is subject to further action. For example, the message may be quarantined while immediate notification is sent to an Administrator of the potential data leak. Thus, processing gateway 930 may be configured to take the action wherein the data package is quarantined for manual processing based on the data leak notification triggered. In another example, the message may be temporarily quarantined until an auto-encryption protocol is performed within the pipeline of the gateway product. Thereafter, the message may be safely delivered to a recipient during operation.

The processing gateway may further include digital learning processor 934 that allows for the accumulation and storage of historical results. In this way, the processing system may also be used to identify patterns and take actions based on the patterns recognized. In other words, the processing gateway includes a digital learning processor for processing the fingerprint comparison and refining a mapped association among the assets and domains based on the identified digital fingerprint relative to the data perimeter. Such an approach has the ability to map the relationships between messages, people, meta-data and draw from a global content pool to learn and evolve over time. The data processing gateway further allows for the deployment of an asset or domain specific perimeter that leverages machine learning and pattern recognition capabilities to identify data leaks.

Figure 10:
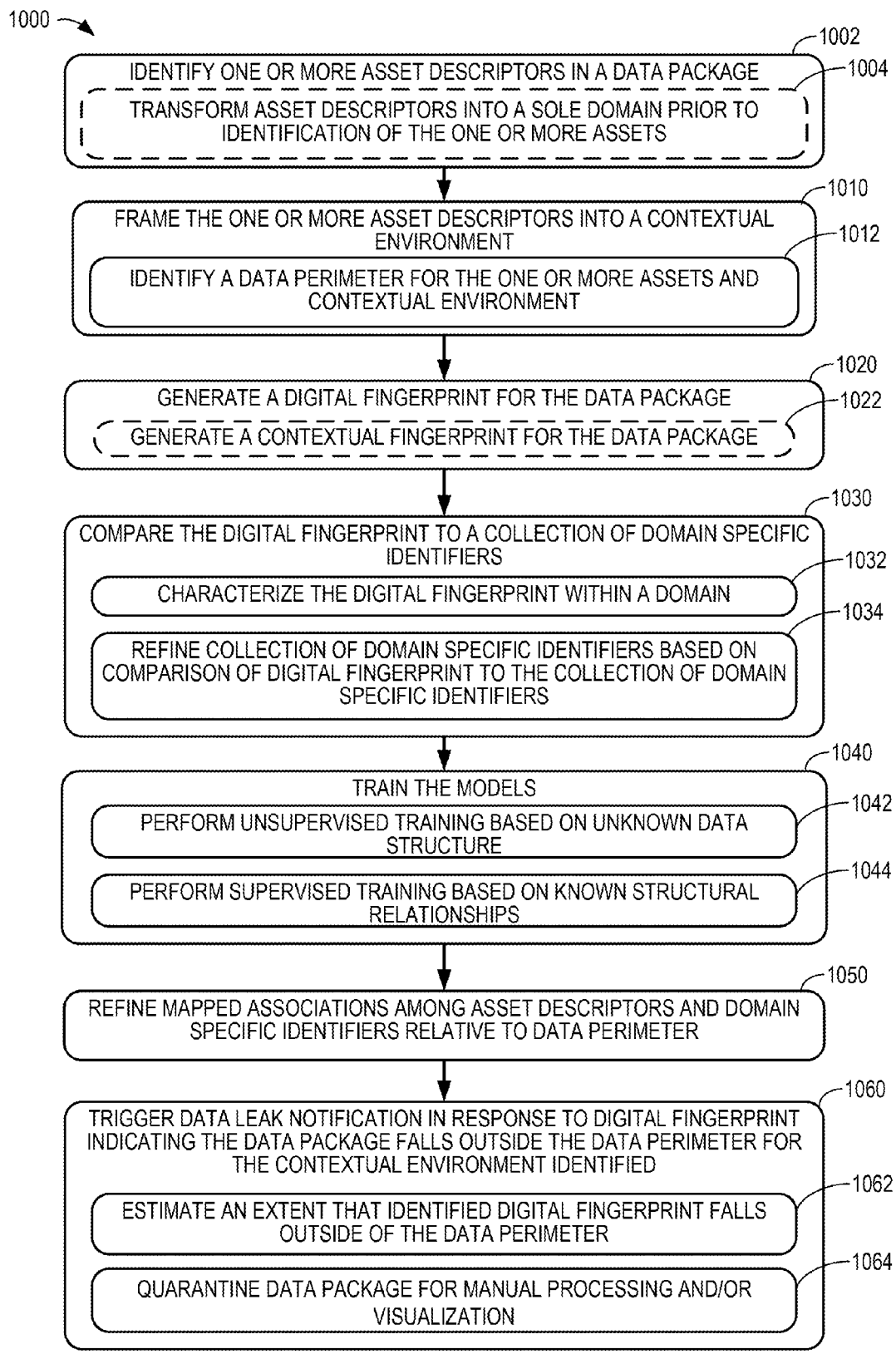
FIG. 10 shows an example flow chart of a method for identifying a data leak using a digital fingerprint with contextual information.

Turning to the methods, FIG. 10 shows example method 1000 for identifying a data leak using a digital fingerprint that includes contextual information. For simplicity, the method is described based on the digital leak protection system shown in FIG. 9.

Method 1000 represents a method for identifying data leaks in a messaging gateway. At 1002, the method comprises identifying one or more asset descriptors within a data package. In some instances, one or more asset descriptors may be optionally transformed into a sole domain prior to identification of the one or more asset descriptors, as indicated at 1004.

At 1010, method 1000 includes framing the one or more assets identified into a contextual environment based on the data package. Then, at 1012, the method further includes identifying a data perimeter for the one or more assets based on the contextual environment identified.

At 1020, method 1000 includes generating a digital fingerprint for the data package. As described herein, the digital fingerprint may be generated based on the one or more assets identified, the contextual environment, and the data perimeter. However, in some instances, the method may further include generating a contextual fingerprint for the data package, the contextual fingerprint being further incorporated into the digital fingerprint, as indicated at 1022. When a contextual fingerprint is generated, the method may further include framing the one or more assets identified into the contextual environment and characterizing a contextual fingerprint for the data package while comparing the contextual fingerprint identified to the collection of domain specific identifiers, each domain specific identifier being configured to characterize the identified contextual fingerprint in the domain.

At 1030, the method includes comparing the digital fingerprint to a collection of domain specific identifiers. Then, at 1032, the digital fingerprint may be characterized in each domain, wherein each domain specific identifier characterizes the digital fingerprint within each domain. At 1034, the collection of domain specific identifiers is refined based on the comparison of the digital fingerprint to the collection of domain specific identifiers. In other words, digital fingerprints and comparisons thereof and mapped associations among the one or more assets and domain specific identifiers may be refined relative to the data perimeter in some instances. In this way, reference digital fingerprints may be updated based on new relational information and data found within the processed messages. For example, the domain specific identifiers may be refined by incorporating new associations identified for the one or more assets, the contextual environment, and the domain specific identifiers.

At 1040, method 1000 includes training a model. In some instances, training may occur in two stages as shown at 1042 and 1044. Box 1042 represents a first unsupervised stage wherein the training is based on unknown data structures within one or more of the data package and fingerprint library. Box 1044 represents a second supervised stage wherein the training is based on known structural relationships within one or more of the data package and fingerprint library.

Accounting for the data perimeter, method 1000 includes refining the mapped associations among asset descriptors and domain specific identifiers relative to the data perimeter at 1050. In this way, digital fingerprints and comparisons thereof and mapped associations among the one or more assets and domain specific identifiers may be refined relative to the data perimeter, which serves to increase the accuracy of the method with time and/or increased processing of larger amounts of data.

At 1060, the method includes triggering a data leak notification in response to a digital fingerprint that indicates the data package falls outside of the data perimeter for the contextual environment identified. Thus, the method may further comprise estimating an extent that the identified digital fingerprint falls outside of the data perimeter for one or more domains, as shown at 1062. Then, a data leak notification may be triggered in response to a digital fingerprint indicating the data package falls outside of the data perimeter for the contextual environment identified, as shown at 1064. Herein, the data package may be quarantined for manual processing based on the triggered data leak notification. However, this action is non-limiting and in other examples, another action may be performed. For example, the data within a data package may be auto-encrypted responsive to a data leak notification based on a domain specific asset.

Figure 11:
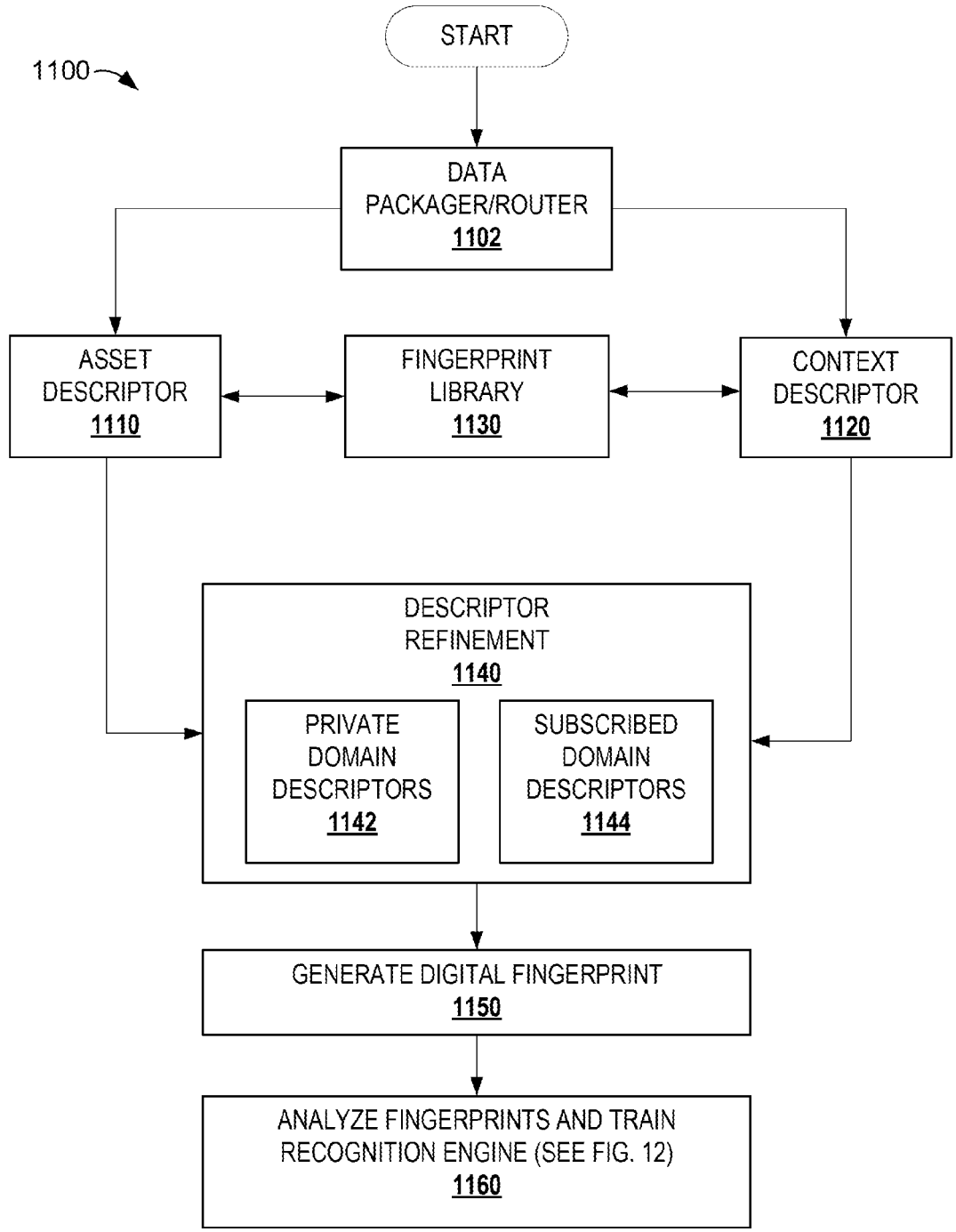
FIGS. 11-13 illustrate example flow charts for identifying a data leak according to the present disclosure.
Figure 12:
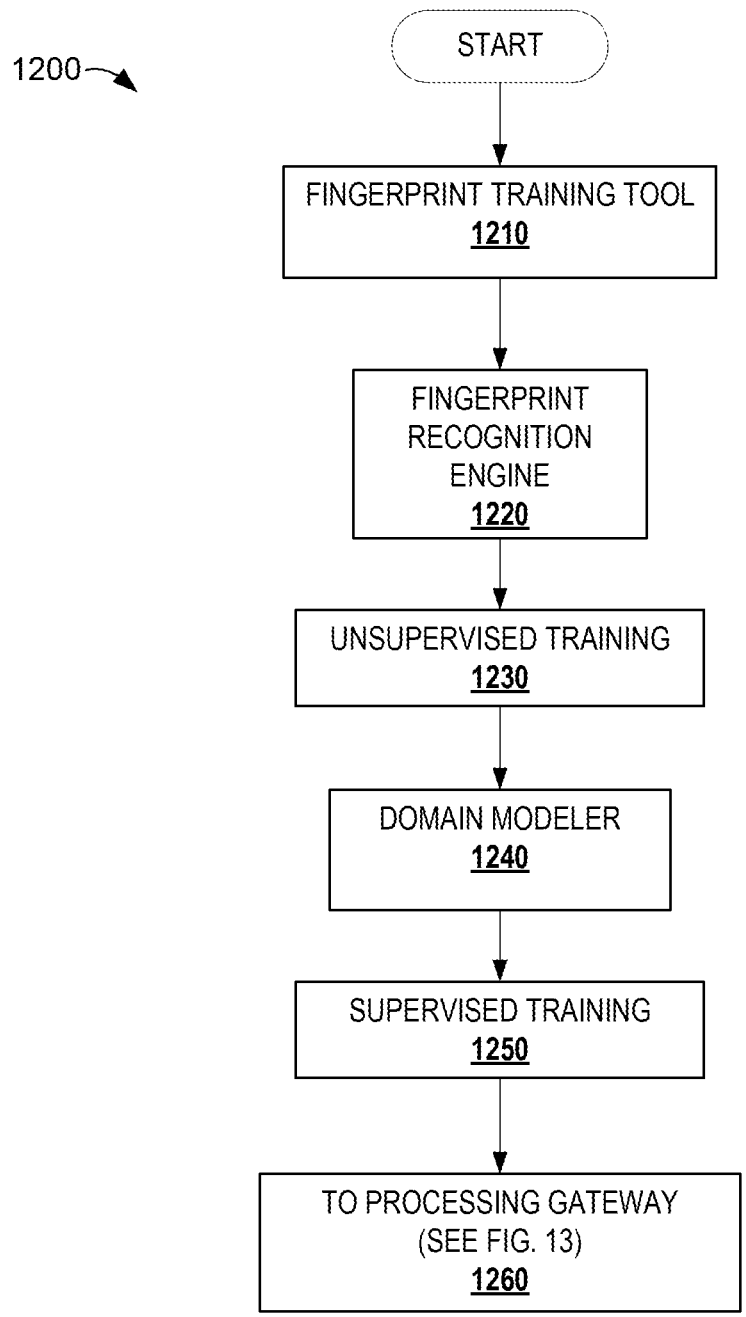
Figure 13:
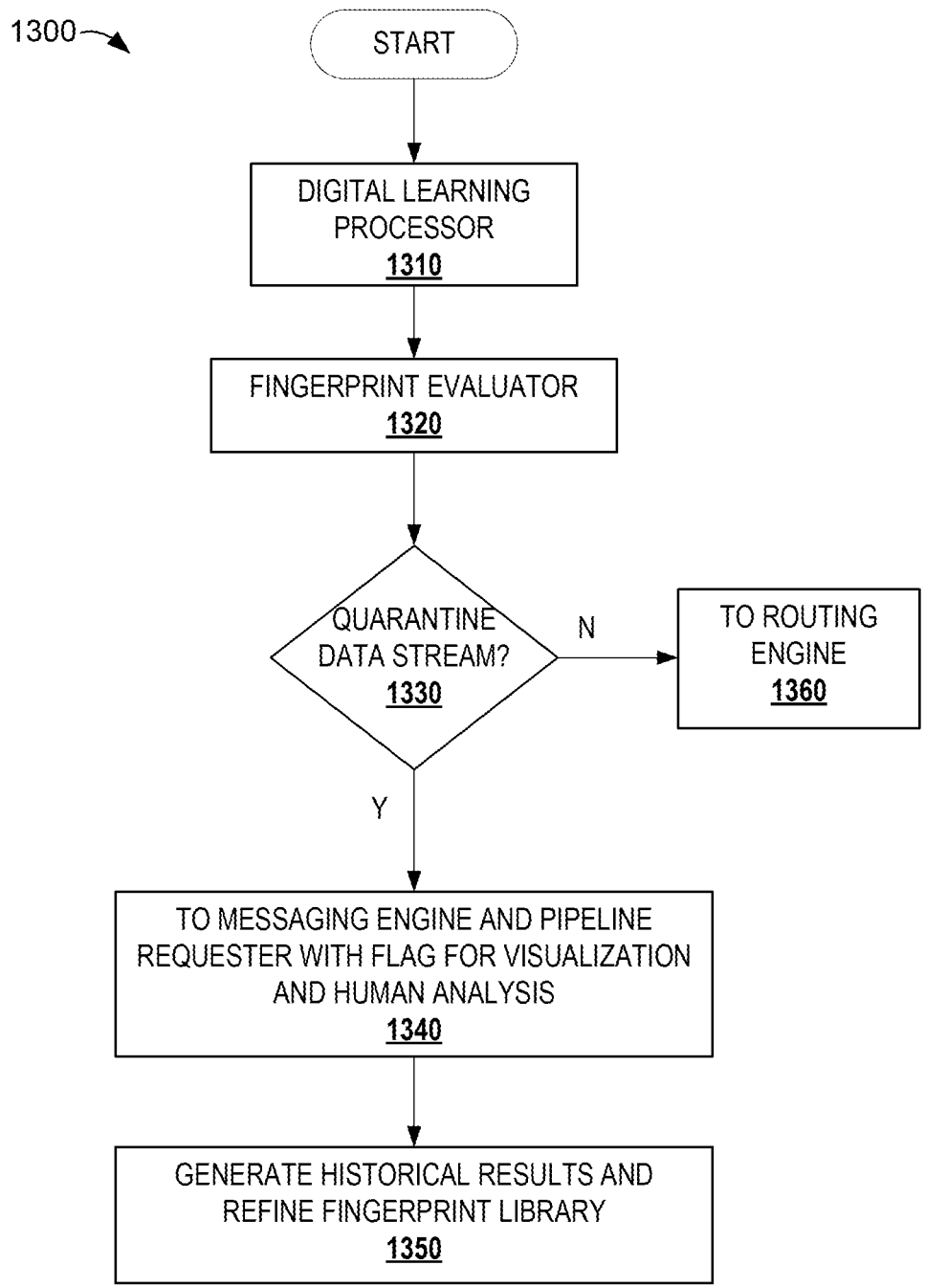

FIGS. 11-13 illustrate example flow charts to illustrate data flow for data leak identification according to the present disclosure. For simplicity, the example flow charts are described in relation to an example application using a description of an organization wherein the system is deployed. FIG. 11 schematically illustrates an exemplary method for generating the digital fingerprint; whereas FIG. 12 schematically illustrates an exemplary method for analyzing the digital fingerprint while refining a recognition engine based on the analyzed digital fingerprint; and FIG. 13 schematically illustrates an exemplary method for triggering a data leak notification and quarantining a message for further visualization and/or analysis by human intervention.

Consider example Company A, a 5000 seat global organization with 25 offices, a fully-staffed in-house IT department and a client list including a large set of Fortune 100 companies. Within Company A, the communications infrastructure spans numerous instances of on premise servers, office deployments and external contractors while employee communication spans 12 different languages. Such a vast organizational network presents broad and possibly complex informational security challenges. For example, securing information within data transmissions may include ensuring the safety of proprietary information, maintaining ethical walls, and/or protecting customer data in transit. An ethical wall is a process for avoiding conflicts of interest by limiting the disclosure of information to certain employees or individuals within a firm or corporation, thereby building a type of firewall between the holders of information and colleagues or other employees that may represent conflicting interests or hold opinions which conflict with the information held. Such information may be indicative of a company asset whose value is held private and thereby protected. This scenario presents an exemplary environment within which the data leak protection system may be advantageously used to enhance the data security while increasing the decision making value to one or more business stakeholders (e.g., board members or executive management).

FIG. 11 schematically illustrates exemplary method 1100 for generating the digital fingerprint. Although shown with a different arrangement than that of FIG. 9, the processing steps and fingerprint generator nonetheless incorporate the features already described. The digital fingerprint may thus be generated based on the information identified. For this reason, at 1102, the data flow into the data leak protection system is directed to data packager/router 1110. As one example, when deployed in a secure messaging gateway, the data may be parsed in the messaging engine (e.g., messaging engine 110 of FIG. 2). Thereafter, the data may be sent to a router where a lexical analysis is employed to identify the various elements (e.g., asset keywords or contextual indicators) and to provide groupings based on the data processed. Then, specific data elements may be directed to asset and context descriptors (e.g., in different directions) based on the results of the lexical analysis performed on the data inflow. Alternatively, it is also possible to process data packages serially or in parallel by simply directing the entire data package to both the asset and context descriptors for further processing The DLP system may use a security and privacy architecture designed to allow for processing and analysis of sensitive content without sacrificing privacy or security. For example, a first corpus of data comprising one or more of a document, a message and an archival element may be directed to asset descriptor 1110 while a second corpus of data comprising at least one of a messaging log, a mail log, and a network log is sent to context descriptor 1120. Secured asset descriptors and digital information fingerprints can be used as sentries for detecting the presence and or use of company assets outside of a normal expected context. In other words, fingerprints falling within a data perimeter may indicate the transmission of data assets is a low risk activity.

Asset descriptors generated from the first corpus of data may be compared to fingerprint library 1130, which may include the collection of asset references defining how assets are viewed in the various organizational domains. Likewise, context descriptors generated from the second corpus of data may also be compared to fingerprint library 1130, to define how assets are viewed in the various organizational domains. In this way, the micro-edification of the data leak protection system may be configured specifically to a single organization like Company A. During usage, the system may begin learning the nuances of employee communications and thereby reduce a burden on the IT resources (e.g., by reducing a searching time on the departmental staff). For Company A this type of deployment means that the value of the DLP system grows based on the length of deployment time of the system on the network. The advantage of such a system is a learning and maturation that mirrors a company's particular trove (or collection) of data (e.g., organizational syntax or domain-specific lexicon) that grows with each message sent and/or received.

For example, Mohammed is a sales manager that sends repeated emails having large attachments to a personal e-mail account on Fridays between 2:00 and 4:00 PM. The DLP system accounts for many variables such as the confidentiality policies within Company A, as well as the time of day, size of attachment and/or position of Mohammed (e.g., the employee) to build new rules or associations that flag the action noted above while potentially delivering a notification to Information Security Administrators if the behavior identified falls outside of the normal expectations of Company A's policies. As another example, Sarah is the Managing Director of Company A's EMEA operations. She receives meeting reminders every morning at 8:00 AM from her Executive Assistant. The messages have a file size below 2 KB, and routinely include the same recipients without confidential information. The DLP system processes these messages and accounts for the routineness of the contents to classify the information data flow with a lower risk value.

In addition to analyses of message metadata, the DLP system may leverage pattern recognition and cluster analysis capabilities to interpret information behind the actual content within a message. As yet another example, David is a customer relationship manager who is in regular contact with Company A's clients. Davis often sends out e-mails with attachments to external recipients located outside of the data perimeter. Clients often reply back with an attachment of the same name but having a larger file size. The DLP system may recognize such data transmissions as a solicitation for client information, which may prompt additional communications to be encrypted to protect personal data elements during future data transmissions. Thereafter, hardware resources of the data leak protection system may be enhanced further by quickly identifying the message and contents without processing the messages via the data fingerprinting methods described. The advantage and utility of the system thus includes differentiating messages falling within a data perimeter from those at a higher risk falling outside of the data perimeter, which are scrutinized at a higher level of detail.

Examples of parameters analyzed for identification of data leaks are provided in Table 1.

TABLE 1

| sender profile | recipient(s) profile |
| --- | --- |
| number of recipients | internal/external recipients |
| attachment type and size | delivery method (Outlook, OWA, mobile) |
| timestamp | duration between responses on message chain |
| language | existence of S/MIME |
| embedded images/URLs | HTML vs plain text |

Continuing with the description of method 1100, after comparison to fingerprint library 1130 that allows identification of the asset and context descriptors, the method continues to descriptor refinement shown at box 1140. Because organizations use vocabulary elements that vary tremendously, even within the units of the organization, domain descriptors include information that can be used to refine asset and context descriptors by refining the domain in which the asset and context descriptors exist. In practice, domain descriptors may include one or more lexicons along with various rules and/or policies used to refine asset and context descriptors. As shown, domain refinement may further include private domain descriptors 1142 and subscribed domain descriptors 1144. In this way, the DLP system may be configured to employ information within the organization or from, e.g., an industry-wide database that tracks keywords and associations within the industry at large to further enhance the secure transmission of data information.

For example, the macro-edification capabilities of the DLP system can be used to assist organizations ensure compliance within a framework of ever-evolving regulatory statutes. As new information comes to light and policies continue to grow, each deployed DLP may gain additional insights into evolving syntactical usages from machine learning that provides benefit from the increasing capacity of the global neural network.

For example, an alternate investment management arm of Company A provides wealth management services to high net worth individuals and charity organizations. As the expectations and disclosure requirements of the Securities and Exchange Commission (SEC) in the United States continue to evolve and progress, the DLP's SEC rule set may grow in parallel with the SEC policies. Therefore, any updates may trickle down to each and every installation such that the entire organization benefits from the continued evolution.

Company A may also own a network of private health and orthopedic surgery clinics, where secure messaging and protecting personal data is a central component of daily communications. When an office sends an email containing, e.g., x-ray specifications on ACL surgery, these messages may consistently be of the same size and extension structure. Thus, a rule for the encryption of this data may be added to the global policy of the DLP system to the benefit of all Health Insurance Portability and Accountability Act (HIPAA) regulated organizations. For example, a doctor providing personalized medical advice to patients may send the data via encrypted messages that allow for a secure communication channel. For this reason, the DLP system may be configured to recognize and detect keywords such as a proximity string comprising "aspirin+take+water". Based on this detection, the DLP system may infer that messages containing "take+water" within a certain distance of each other may be flagged for potential encryption. Based on the system and methods disclosed, the message may be quarantined for further processing via the auto-encryption device prior to delivery of the message to a recipient that is a patient.

The data leak protection system disclosed provides deployment flexibility supporting a roll-out approach during deployment. For example, the DLP system can wrap around or replace existing DLP policies. Then, by learning from the existing DLP policies of Company A within the network (or global) infrastructure, the satellite office in, e.g., Dubai can benefit from the same protection as the corporate headquarters in London or New York. Alternatively, where security may be tighter due to a relatively small team, the DLP system may be scaled upwards to the benefit of the entire organization.

An open API architecture of the DLP system further enables integration with Company A's message Archive containing email, Lync and/or other industry specific messaging protocols. The examples provided demonstrate the ability of the DLP system to proactively learn from message contents, meta-data parameters and people within and outside of the business infrastructure.

At 1150, the information processed may be used to generate a digital fingerprint for the message or data package. In some instances, the digital fingerprint may further include a contextual fingerprint. However, even when no contextual fingerprint is included, the digital fingerprint may include contextual information that is used to determine a risk level of the data transmission relative to the data perimeter within a domain. Once a digital fingerprint has been generated, the data flow of method 1100 may proceed to box 1160 such that the digital fingerprint is analyzed and used to train the fingerprint recognition engine.

FIG. 12 schematically illustrates an exemplary analysis and training method for analyzing the digital fingerprint while refining a recognition engine based on the digital fingerprint analyzed.

In machine learning and related fields, artificial neural networks are computational models inspired by an animal's central nervous systems (and, in particular, the brain) which is capable of machine learning as well as pattern recognition. Artificial neural networks are often presented as systems of interconnected "neurons" which can compute values from inputs. In decision-making, the rationality of individuals may be limited by the information known to the individuals, the cognitive limitations of their minds, and the finite amount of time available for making a decision. Because decision-makers may lack the ability and resources to arrive at an optimal solution, they may instead apply their rationality after greatly simplifying the choices available. In this way, the decision-maker may seek a satisfactory solution rather than an optimal one, due to the finite computational resources available.

For this reason, the methods disclosed use machine learning to generate an evolving database of domain-specific information. At 1210, method 1200 includes a fingerprint training tool, wherein digital fingerprints are analyzed for relational connectivities and used to enhance the fingerprint recognition engine 1220. As described above, the fingerprint recognition engine may be used for identifying information like asset and context descriptors within a message. Then, during analysis and training, the database or collection of information may be updated by refining a mapped association among the assets and domains based on the identified digital fingerprint relative to the data perimeter.

At 1230, unsupervised training is performed on the digital fingerprint wherein machine learning is used to find or uncover hidden structures within unlabeled data elements. At 1240, domain modeler is included for transforming the asset descriptor into a sole domain prior to the identification of the one or more assets within the corpus of data. At 1250, supervised training is performed wherein a function is inferred based on a fully labeled training data set. For example, a supervised learning algorithm may be used to analyze existing data sets with the goal of classifying new information based on the existing mapped interrelationships available. As one example, a SPAM filter may be used with an up-to-date version of the DLP system. At 1260, the data flow may be further directed to the processing gateway.

FIG. 13 schematically illustrates method 1300 that is an exemplary processing gateway method for triggering a data leak notification and quarantining a message for further visualization and/or analysis by human intervention.

When a data package (e.g., a mail or message stream) reaches the processing gateway, digital learning processor 1310 may analyze the digital package to further map new associations identified. In the example described, the learning process is a neural network processor, which is a computational model inspired by an animal's central nervous system for recognizing patterns within data. The neural network herein is adapted to account for contextual information to prevent data leaks from occurring during day-to-day operations.

At 1320, the neural analyzer is used as a fingerprint evaluator to determine the level of risk associated with a particular data message relative to the identified data perimeter. As described above, the data perimeter of a domain may be identified wherein the asset descriptors and/or context descriptors are quantified to further determine whether a potential risk of a data leak is present.

For this reason, at 1330, the processing gateway may be configured to make a decision regarding an action to be taken for the data package or stream. Herein, the action taken is a quarantining action, however other actions are possible (e.g., auto-encryption). If the data package is to be quarantined, at 1340, the data package may be directed back to the messaging engine of the message processing device where the message is directed to a pipeline requester along with a flag denoting a visual inspection by human analysis is to be performed. Thereafter, the fingerprint library may be updated at 1350 by generating historical results and further refining the DLP system to reflect the potential new connections available in the mapped domain infrastructure. Alternatively, if the data stream has a low risk for potential data leakage, the data package may be directed to routing engine 1360 where the message is added to the outbound queue for transmission to the destination recipient(s).

In this way, the system according to the present description incorporates machine learning and directs actions to be performed in an environment that optimizes a system efficiency, for example, by striking a balance between exploration (e.g., of uncharted data territories) and exploitation (e.g., of current data connectivity's and industry-wide or organization specific knowledge). The advantage of this system is that the machine learning environment and DLP system may be deployed without any existing pre-determined rules or rule-sets. Then, based on mapped connectivity detected and identified, newly formed associations may be added to the fingerprint library and fingerprint recognition engine that are used to assess the occurrence of data leaks. The ability to apply unsupervised and reinforced learning principles on data communications flow in and out of a business may produce information security that incorporates business strategies and decision-making capabilities whereas previous information security systems represent a high cost enterprise that uses corporate resources like an IT department staff inefficiently.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy used.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed, as well as any and all equivalents thereof.

The invention claimed is:

1. A data leak protection system implemented on a message processing device configured to identify and analyze a digital fingerprint for a data package, the system comprising:
a digital fingerprint generator for identifying the digital fingerprint based on a corpus of data within the data package, and characterizing the data package based on the digital fingerprint, the digital fingerprint generator further comprising;
an asset descriptor for identifying one or more assets within the corpus of data;
a contextual analyzer for framing the one or more assets into a prevailing contextual environment that is derived from a unique context identified for the data package; and
a domain identifier that is both specific and adaptable to the one or more assets and the prevailing contextual environment for identifying a data perimeter based on the one or more assets and the prevailing contextual environment;
a fingerprint analyzer configured to compare the identified digital fingerprint for the data package to a collection of domain specific identifiers, each domain specific identifier characterizing the identified digital fingerprint in one or more domains; and
a processing gateway configured to trigger a data leak notification when the identified digital fingerprint falls outside of the data perimeter for the one or more domains.

2. The data leak protection system of claim 1, further comprising:
a contextual fingerprint generator for characterizing one or more contextual patterns within the data package, the fingerprint analyzer configured to compare a contextual fingerprint identified for the data package to the collection of domain specific identifiers, each domain specific identifier being further configured to characterize the contextual fingerprint in the one or more domains.

3. The data leak protection system of claim 2, further comprising a fingerprint library, the fingerprint library storing the collection of domain specific identifiers and asset references used to characterize the one or more assets.

4. The data leak protection system of claim 3, wherein the fingerprint library includes a fingerprint recognition engine that is refined based on feedback received from the fingerprint analyzer.

5. The data leak protection system of claim 1, wherein the fingerprint analyzer includes a domain modeler for transforming the asset descriptor into a sole domain prior to the identification of the one or more assets within the corpus of data.

6. The data leak protection system of claim 4, wherein the fingerprint analyzer includes a fingerprint training tool that identifies new associations between assets and domains, and incorporates the newly identified associations into the fingerprint recognition engine.

7. The data leak protection system of claim 5, wherein the fingerprint training tool is configured to perform training in two stages, the two stages comprising:
a first unsupervised stage wherein the training is based on unknown data structures within at least one of the data package and the fingerprint library; and
a second supervised stage wherein the training is based on known structural relationships within at least one of the data package and fingerprint library.

8. The data leak protection system of claim 1, wherein the processing gateway includes a digital learning processor for processing the fingerprint comparison and refining a mapped association among the assets and domains based on the identified digital fingerprint relative to the data perimeter.

9. The data leak protection system of claim 8, wherein the processing gateway further includes a fingerprint evaluator for estimating an extent that the identified digital fingerprint falls outside of the data perimeter for the one or more domains.

10. The data leak protection system of claim 9, wherein the processing gateway is configured to quarantine the data package for manual processing based on the data leak notification triggered.

11. A method of identifying data leaks in a messaging gateway implemented at least in part on a message processing device, comprising:
identifying one or more asset within a data package via an asset descriptor,
framing the one or more assets identified into a contextual environment that is derived from a unique context based on the data package; and
identifying a data perimeter via a domain identifier that is both specific and adaptable to the one or more assets and the contextual environment for the one or more assets based on the contextual environment identified;
generating a digital fingerprint for the data package based on the one or more assets identified, the contextual environment, and the data perimeter;
comparing the digital fingerprint to a collection of domain specific identifiers, each domain specific identifier characterizing the digital fingerprint within the domain; and
triggering a data leak notification in response to a digital fingerprint that indicates the data package falls outside of the data perimeter for the contextual environment.

12. The method of claim 11, wherein framing the one or more assets identified into the contextual environment includes characterizing a contextual fingerprint for the data package, and comparing the contextual fingerprint identified to the collection of domain specific identifiers, each domain specific identifier being configured to characterize the identified contextual fingerprint in the domain.

13. The method of claim 12, wherein the collection of domain specific identifiers is refined based on the comparison of the digital fingerprint to the collection of domain specific identifiers.

14. The method of claim 13, wherein modeling the domain specific identifiers transforms the asset descriptor into a sole domain prior to the identification of one or more assets.

15. The method of claim 14, wherein the domain specific identifiers are refined by incorporating new associations identified for the one or more assets, the contextual environment, and the domain specific identifiers.

16. The method of claim 15, wherein training occurs in two stages, the two stages comprising:
a first unsupervised stage wherein the training is based on unknown data structures within one or more of the data package and fingerprint library; and
a second supervised stage wherein the training is based on known structural relationships within one or more of the data package and fingerprint library.

17. The method of claim 16, wherein digital fingerprints and comparisons thereof and mapped associations among the one or more assets and domain specific identifiers refined relative to the data perimeter.

18. The method of claim 17, further comprising estimating an extent that the identified digital fingerprint falls outside of the data perimeter for one or more domains.

19. The method of claim 18, wherein a data leak notification is triggered in response to a digital fingerprint indicating the data package falls outside of the data perimeter for the contextual environment, and wherein the data package is quarantines for manual processing based on the triggered data leak notification.

20. A method of identifying data leaks in a messaging gateway implemented at least in part on a message processing device, comprising:

identifying one or more assets within a data package, framing the one or more assets identified into a contextual environment that is derived from a unique context; and identifying a data perimeter via a domain identifier that is both specific and adaptable to the one or more assets and the contextual environment for the one or more assets and the contextual environment;

generating a digital fingerprint for the data package based on the one or more assets identified, the contextual environment, and the data perimeter;

generating a contextual fingerprint for the data package based on the one or more assets identified, the contextual environment, and the data perimeter, the contextual fingerprint being further incorporated into the digital fingerprint;

comparing the digital fingerprint to a collection of domain specific identifiers, each domain specific identifier characterizing the digital fingerprint within the domain, wherein the collection of domain specific identifiers is refined based on the comparison of the digital fingerprint to the collection of domain specific identifiers; and triggering a data leak notification in response to a digital fingerprint that indicates the data package falls outside of the data perimeter for the contextual environment, wherein triggering a data leak notification in response to a digital fingerprint that indicates the data package falls outside of the data perimeter for the contextual environment includes quarantining the data package for manual processing based on the triggered data leak notification.

\* \* \* \* \*

UNITED STATES PATENT AND TRADEMARK OFFICE
CERTIFICATE OF CORRECTION

| | |
|---|---|
| PATENT NO. | : 9,754,217 B2 |
| APPLICATION NO. | : 14/702504 |
| DATED | : September 5, 2017 |
| INVENTOR(S) | : Thierry LeVasseur |

Page 1 of 1

It is certified that error appears in the above-identified patent and that said Letters Patent is hereby corrected as shown below:

In the Claims

Column 28, Line 22, insert --s-- after 'asset.'

Signed and Sealed this
Twelfth Day of December, 2017

Joseph Matal
*Performing the Functions and Duties of the
Under Secretary of Commerce for Intellectual Property and
Director of the United States Patent and Trademark Office*